(12) United States Patent
Kato

(10) Patent No.: US 9,786,323 B2
(45) Date of Patent: Oct. 10, 2017

(54) INFORMATION PROCESSING DEVICE, INFORMATION PROCESSING METHOD, AND PROGRAM

(71) Applicant: Sony Corporation, Tokyo (JP)

(72) Inventor: Motoki Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 393 days.

(21) Appl. No.: 14/360,740

(22) PCT Filed: Nov. 27, 2012

(86) PCT No.: PCT/JP2012/007584
§ 371 (c)(1),
(2) Date: May 27, 2014

(87) PCT Pub. No.: WO2013/080517
PCT Pub. Date: Jun. 6, 2013

(65) Prior Publication Data
US 2015/0098692 A1    Apr. 9, 2015

(30) Foreign Application Priority Data

Nov. 29, 2011    (JP) ................................ 2011-260279

(51) Int. Cl.
*H04N 5/84*    (2006.01)
*H04N 5/89*    (2006.01)
(Continued)

(52) U.S. Cl.
CPC .......... *G11B 27/031* (2013.01); *G11B 27/034* (2013.01); *G11B 27/10* (2013.01); *G11B 27/105* (2013.01)

(58) Field of Classification Search
USPC .................................................. 386/334–386
See application file for complete search history.

(56) References Cited

U.S. PATENT DOCUMENTS 6,381,403 B1 * 4/2002 Tanaka ............. G11B 20/10527
386/241
7,474,840 B2    1/2009 Kato et al.
(Continued)

FOREIGN PATENT DOCUMENTS

EP    1367587 A1    12/2003
EP    2018054 A1    1/2009
JP    2002-158972 A    5/2002

OTHER PUBLICATIONS

International Search Report from International Publication PCT/JP2012/007584 dated Mar. 28, 2013.

*Primary Examiner* — Nigar Chowdhury
(74) *Attorney, Agent, or Firm* — Chip Law Group

(57) ABSTRACT

An information processing device includes: a recording unit that records a flag representing that actual state information as an actual state of contents, which is referred to by reproduction information, is referred to by other reproduction information; a search unit that searches for the actual state information that is deletable by using the flag, in a case where deletion of the reproduction information is instructed; and a deletion unit that deletes the reproduction information of an object to be deleted and the deletable actual state information, in a case where the deletion of the reproduction information is instructed.

13 Claims, 34 Drawing Sheets

(51) Int. Cl.
    *G11B 27/031* (2006.01)
    *G11B 27/034* (2006.01)
    *G11B 27/10* (2006.01)

(56) References Cited

U.S. PATENT DOCUMENTS

| | | |
|---|---|---|
| 8,155,502 B2 | 4/2012 | Morimoto et al. |
| 8,670,646 B2 | 3/2014 | Kato et al. |
| 2002/0135607 A1 | 9/2002 | Kato et al. |
| 2002/0150383 A1 | 10/2002 | Kato et al. |
| 2003/0156825 A1 | 8/2003 | Um et al. |
| 2003/0228134 A1* | 12/2003 | Kim ............... G11B 27/034 386/281 |
| 2006/0026634 A1 | 2/2006 | LaChapelle et al. |
| 2007/0097805 A1 | 5/2007 | Hasegawa |
| 2012/0075969 A1* | 3/2012 | Watanabe ............ G11B 27/034 369/30.08 |

\* cited by examiner

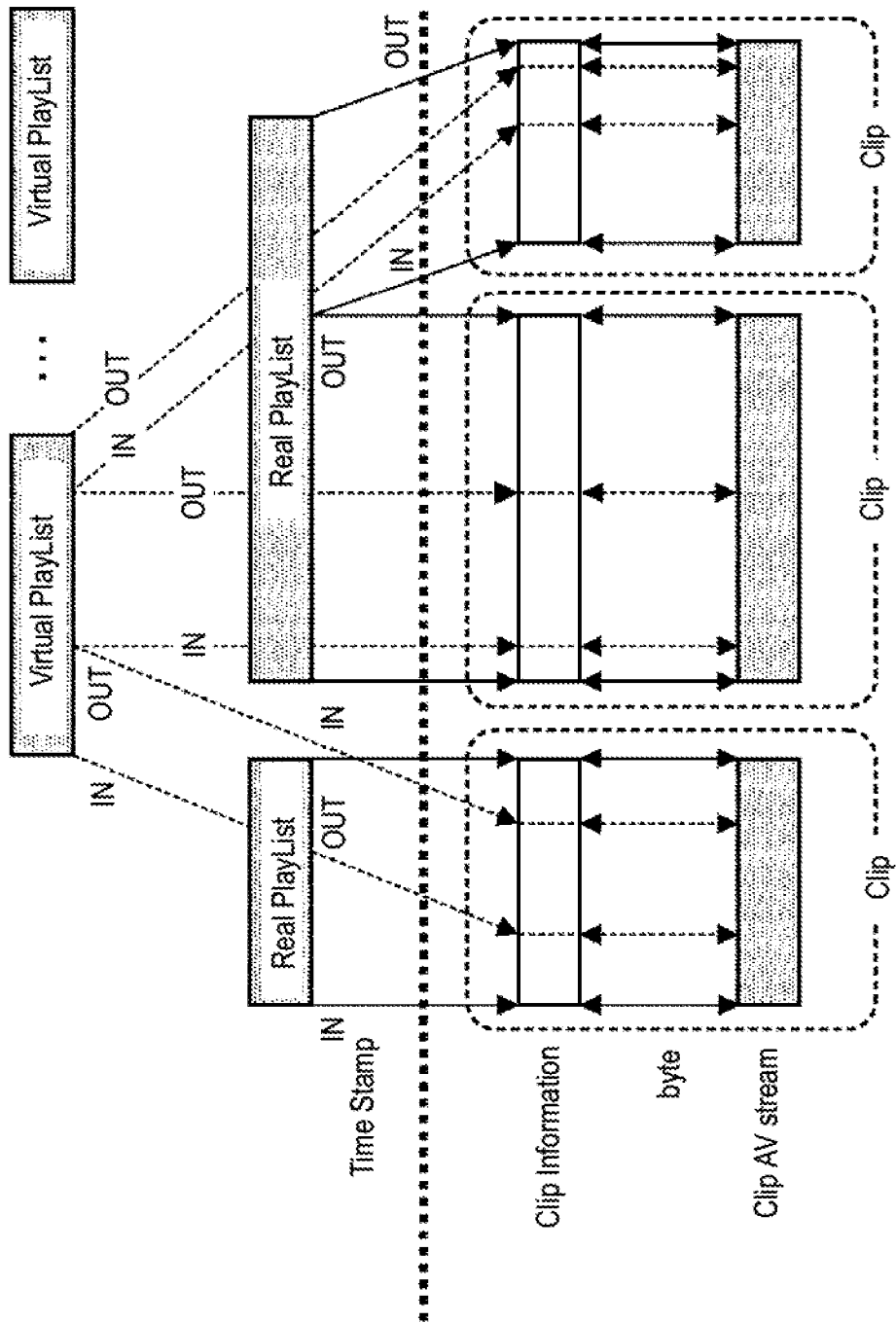

EXAMPLE OF CREATION OF Real PlayList

EXAMPLE OF DIVISION OF Real PlayList

EXAMPLE OF COMBINATION OF Real PlayList

EXAMPLE OF DELETION OF ENTIRETY OF Real PlayList

BOTH Real PlayList AND Clip ARE DELETED

EXAMPLE OF PARTIAL DELETION OF Real PlayList

EXAMPLE OF MINIMIZING OF Real PlayList

EXAMPLE OF ASSEMBLE EDITING
FIG.7
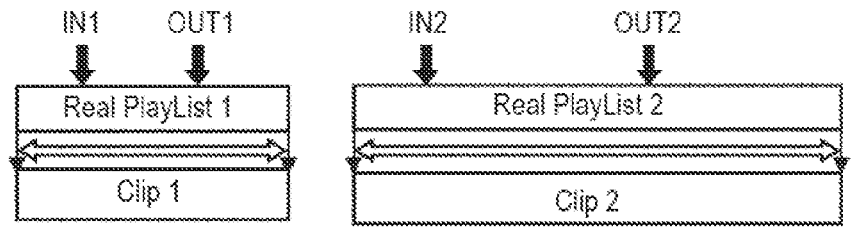
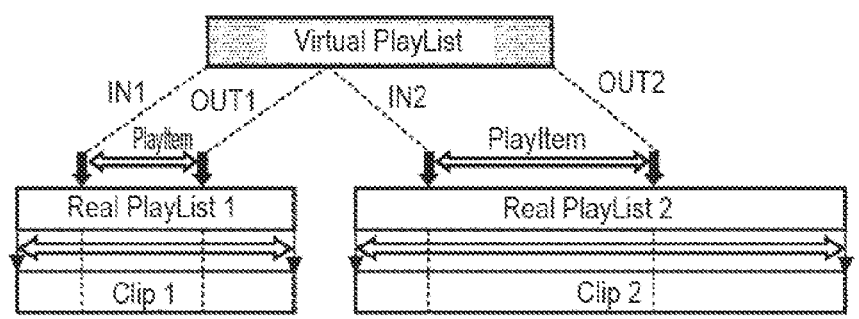
FIG.8
EXAMPLE OF AUDIO DUBBING TO Virtual PlayList
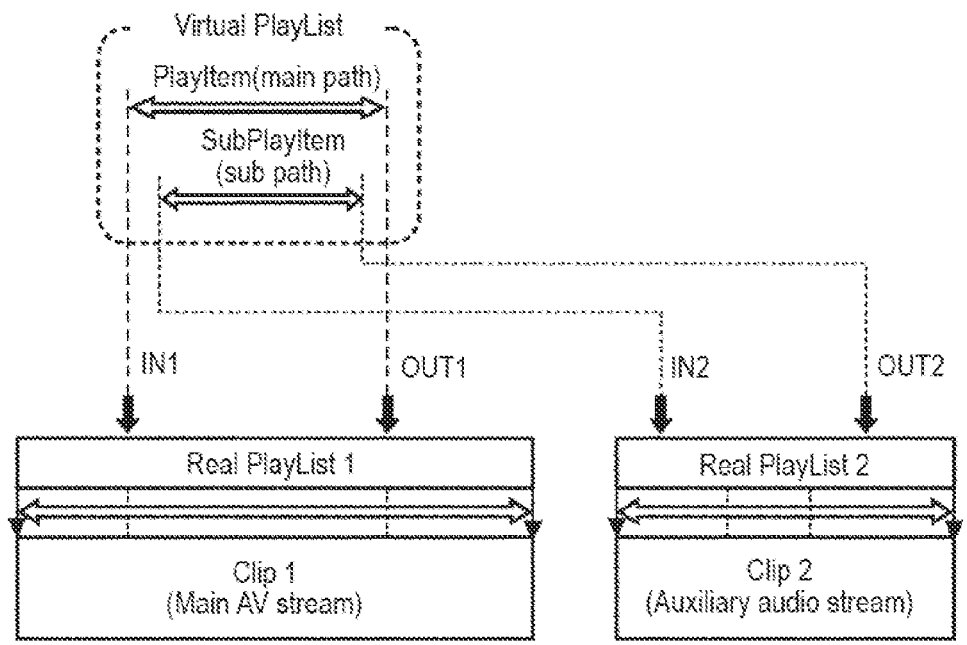

EXAMPLE OF CHANGE OF PlayList REPRODUCING SEQUENCE

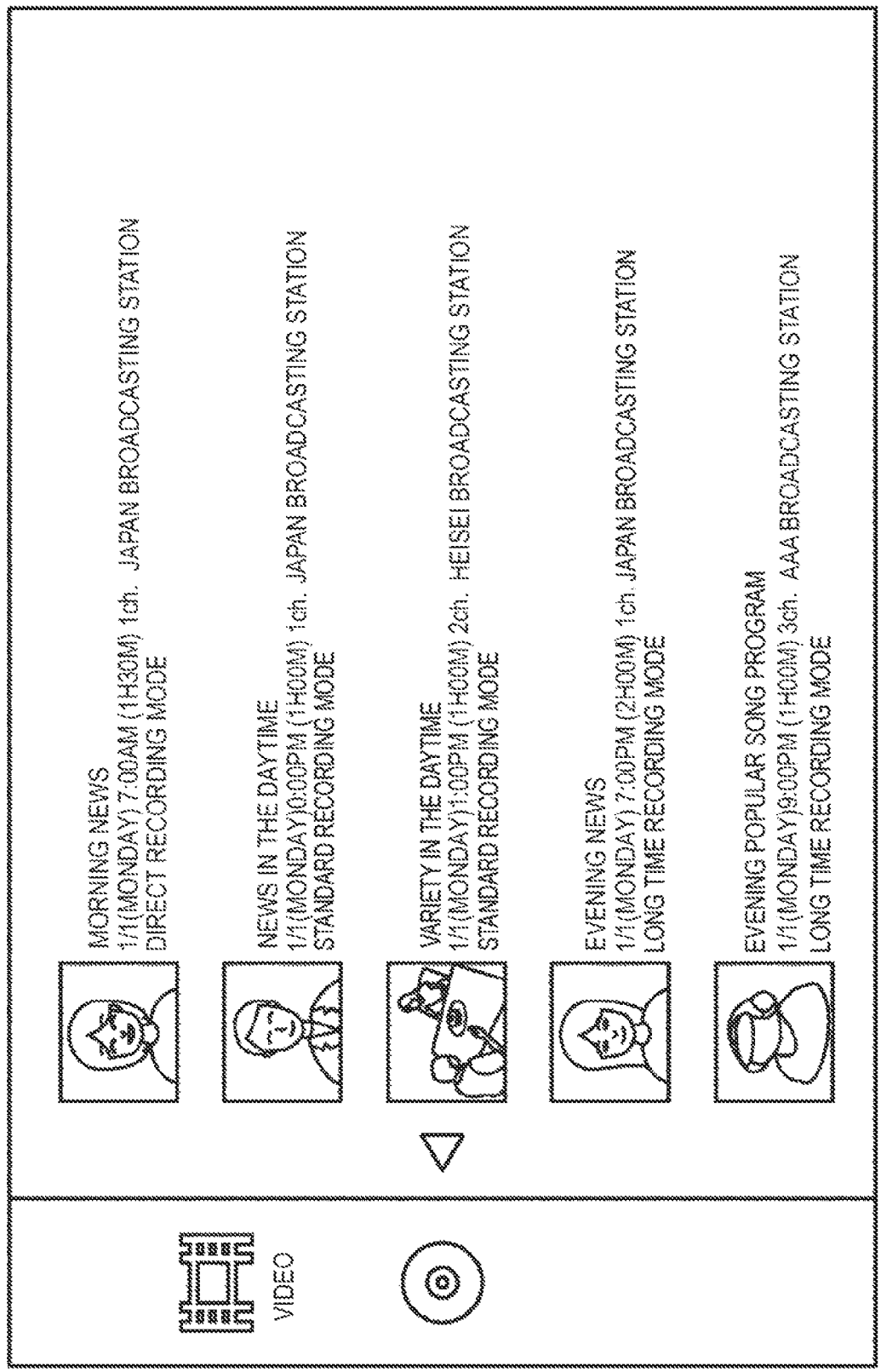

FIG.17

| Syntax | No. of bits | Mnemonic |
|---|---|---|
| INDEX_BAV () { | | |
|     type_indicator | 8*4 | bslbf |
|     version_number | 8*4 | bslbf |
|     reserved_for_future_use | 256 | bslbf |
|     length | 32 | uimsbf |
|     number_of_PlayLists | 16 | uimsbf |
|     for (k=0; k<number_of_PlayLists; k++) { | | |
|         PlayList_file_name[k] | 8*5 | bslbf |
|         reserved_for_future_use | 8 | bslbf |
|         index_info_start_address[k] | 32 | uimsbf |
|     } | | |
|     for (i=0; i<X; i++) { | | |
|         padding_word | 16 | bslbf |
|     } | | |
|     for (k=0; k<number_of_PlayLists; k++){ | | |
|         index_info[k]() { | | |
|             ref_to_menu_thumbnail_index[k] | 16 | uimsbf |
|             PlayList_character_set[k] | 8 | uimsbf |
|             reserved_for_future_use | 7 | bslbf |
|             is_played_flag[k] | 1 | bslbf |
|             is_virtual_PL[k] | 1 | bslbf |
|             is_shared_Clip[k] | 1 | bslbf |
|             time_zone[k] | 8 | bslbf |
|             reserved_for_future_use | 7 | bslbf |
|             record_time_and_date[k] | 4*14 | bslbf |
|             PlayList_duration[k] | 4*6 | bslbf |
|             channel_number[k] | 16 | uimsbf |
|             reserved_for_future_use | 8 | bslbf |
|             channel_name_length[k] | 8 | uimsbf |
|             channel_name[k] | 8*20 | bslbf |
|             PlayList_name_length[k] | 8 | uimsbf |
|             PlayList_name[k] | 8*255 | bslbf |
|             length_mpd[k] | 16 | bslbf |
|             if (length_mpd != 0) { | | |
|                 mdp[k]() { | | |
|                     maker_ID[k] | 16 | uimsbf |
|                     maker_model_code[k] | 16 | uimsbf |
|                     maker_private_data[k] | (length_mpd-4)*8 | |
|                 } | | |
|             } | | |
|         } | | |
|         for (i=0; i<Y; i++) { | | |
|             padding_word | 16 | bslbf |
|         } | | |
|     } | | |
| } | | |

FIG. 18

| Syntax | No. of bits | Mnemonic |
|---|---|---|
| INFO.BAV { | | |
|   type_indicator | 8*4 | bslbf |
|   version_number | 8*4 | bslbf |
|   TableOfPlayLists_start_address | 32 | uimsbf |
|   ExtensionData_start_address | 32 | uimsbf |
|   reserved_for_future_use | 192 | bslbf |
|   UIAppInfoBDAV() | | |
|   for(i=0; i<N1; i++){ | | |
|     padding_word | 16 | bslbf |
|   } | | |
|   TableOfPlayLists() | | |
|   for(i=0; i<N2; i++){ | | |
|     padding_word | 16 | bslbf |
|   } | | |
|   ExtensionData() | | |
|   for(i=0; i<N3; i++){ | | |
|     padding_word | 16 | bslbf |
|   } | | |
| } | | |

FIG.19

| Syntax | No. of bits | Mnemonic |
|---|---|---|
| ExtensionData() { | | |
|     length | 32 | uimsbf |
|     if(length !=0){ | | |
|         data_block_start_address | 32 | uimsbf |
|         reserved_for_word_align | 24 | bslbf |
|         number_of_ext_data_entries | 8 | uimsbf |
|         for (i=0; i<number_of_ext_data_entries; i++) { | | |
|             ext_data_entry() { | | |
|                 ID1 | 16 | uimsbf |
|                 ID2 | 16 | uimsbf |
|                 ext_data_start_address | 32 | uimsbf |
|                 ext_data_length | 32 | uimsbf |
|             } | | |
|         } | | |
|         for (i=0; i<L1; i++) { | | |
|             padding_word | 16 | bslbf |
|             padding_word | 16 | bslbf |
|         } | | |
|         data_block() | 32 + 8*(length - data_block_start_address) | |
|     } | | |
| } | | |

FIG.20

```
ExtensionData() {
    length
    data_block_start_address
    number_of_ext_data_entries = 1
    ext_data_entry() {
        ID1 = 0x00F0
        ID2 = 0x0001
        ext_data_start_address
        ext_data_length
    }
    data_block() {
        PL_to_Clips_table()
    }
}
```

FIG.21

| Syntax | No. of bits | Mnemonic |
|---|---|---|
| PL_to_Clips_table() { | | |
|    length | 32 | uimsbf |
|    number_of_PlayLists | 16 | uimsbf |
|    for (k=0; k<number_of_PlayLists; k++) { | | |
|       PlayList_file_name[k] | 8*5 | bslbf |
|       reserved_for_future_use | 8 | bslbf |
|       Clips_table_start_address[k] | 32 | uimsbf |
|    } | | |
|    for (i=0; i<X; i++) { | | |
|       padding_word | 16 | bslbf |
|    } | | |
|    for (k=0; k<number_of_PlayLists; k++) { | | |
|       clips_table[k]() { | | |
|          number_of_PlayItems[k] | 16 | uimsbf |
|          for (i=0; i<number_of_PlayItems[k]; i++) { | | |
|             Clip_Information_file_name[k][i] | 8*5 | bslbf |
|             reserved_for_future_use | 8 | bslbf |
|          } | | |
|       } | | |
|       for (i=0; i<Y[k]; i++) { | | |
|          padding_word | 16 | bslbf |
|       } | | |
|    } | | |
| } | | |

FIG.22

| Syntax | No. of bits | Mnemonic |
|---|---|---|
| xxxxx.RPL/yyyyy.VPL { | | |
|     PlayListMark_Start_address | 32 | uimsbf |
|     MakerPrivateData_Start_address | 32 | uimsbf |
|     reserved | 192 | bslbf |
|     PlayList() | | |
|     for(i=0; i<N1; i++){ | | |
|         padding_word | 16 | bslbf |
|     } | | |
|     PlayListMark() | | |
|     for(i=0; i<N2; i++){ | | |
|         padding_word | 16 | bslbf |
|     } | | |
|     MakerPrivateData() | | |
| } | | |

EXAMPLE OF Real PlayList WHEN AV STREAM IS RECORDED AS Clip FOR THE FIRST TIME

EXAMPLE OF Real PlayList AFTER EDITING

EXAMPLE OF Virtual PlayList

FIG.24

| Syntax | No. of bits | Mnemonics |
|---|---|---|
| PlayList() { | | |
|     version_number | 8*4 | bslbf |
|     length | 32 | uimsbf |
|     PlayList_type | 8 | uimsbf |
|     CPI_type | 1 | bslbf |
|     reserved | 7 | bslbf |
|     UIAppInfoPlayList() | | |
|     number_of_PlayItems  // main path | 16 | uimsbf |
|     if (<Virtual PlayList>) { | | |
|         number_of_SubPlayItems  // sub path | 16 | uimsbf |
|     } else { | | |
|         reserved | 16 | bslbf |
|     } | | |
|     for (PlayItem_id=0; | | |
|         PlayItem_id<number_of_PlayItems; | | |
|         PlayItem_id++) { | | |
|         PlayItem()  // main path | | |
|     } | | |
|     if (<Virtual PlayList>) { | | |
|         if (CPI_type==0 && PlayList_type==0) { | | |
|             for (i=0; i<number_of_SubPlayItems; i++) | | |
|             SubPlayItem()  // sub path | | |
|         } | | |
|     } | | |
| } | | |

FIG.25

| Syntax | No. of bits | Mnemonic |
|---|---|---|
| UIAppInfoPlayList() { | | |
|     length | 32 | uimsbf |
|     reserved_for_future_use | 16 | bslbf |
|     PlayList_character_set | 8 | uimsbf |
|     reserved_for_word_align | 4 | bslbf |
|     playback_protect_flag | 1 | bslbf |
|     write_protect_flag | 1 | bslbf |
|     is_played_flag | 1 | bslbf |
|     is_edited_flag | 1 | bslbf |
|     time_zone | 8 | bslbf |
|     reserved_for_word_align | 8 | bslbf |
|     record_time_and_date | 4*14 | bslbf |
|     PlayList_duration | 4*6 | bslbf |
|     maker_ID | 16 | uimsbf |
|     maker_model_code | 16 | uimsbf |
|     channel_number | 16 | uimsbf |
|     reserved_for_word_align | 8 | bslbf |
|     channel_name_length | 8 | uimsbf |
|     channel_name | 8*20 | bslbf |
|     PlayList_name_length | 8 | uimsbf |
|     PlayList_name | 8*255 | bslbf |
|     PlayList_detail_length | 16 | uimsbf |
|     PlayList_detail | 8*1200 | bslbf |
| } | | |

FIG.26

| Syntax | No. of bits | Mnemonics |
|---|---|---|
| PlayItem() { | | |
|     Clip_Information_file_name | 8*10 | bslbf |
|     reserved | 24 | bslbf |
|     STC_sequence_id | 8 | uimsbf |
|     IN_time | 32 | uimsbf |
|     OUT_time | 32 | uimsbf |
|     reserved | 14 | bslbf |
|     connection_condition | 2 | bslbf |
|     if (<Virtual PlayList>) { | | |
|         if (connection_condition=='10') { | | |
|             BridgeSequenceInfo() | | |
|         } | | |
|     } | | |
| } | | |

FIG.27

| Syntax | No. of bits | Mnemonics |
|---|---|---|
| PlayListMark() { | | |
|     version_number | 8*4 | bslbf |
|     length | 32 | uimsbf |
|     number_of_PlayList_marks | 16 | uimsbf |
|     for(i=0; i < number_of_PlayList_marks; i++) { | | |
|         reserved | 8 | bslbf |
|         mark_type | 8 | bslbf |
|         mark_time_stamp | 32 | uimsbf |
|         PlayItem_id | 8 | uimsbf |
|         reserved | 24 | uimsbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG.28

| Mark type value | Meaning | Note |
|---|---|---|
| 0x00 | Reserved for future use | |
| 0x01 | THIS MARK IS REPRESENTATIVE IMAGE OF PlayList, AND THIS IMAGE IS SELECTED FROM VIDEO PICTURE THAT IS REFERRED TO BY PlayList | • mark_time_stamp REPRESENTS Presentation time stamp of PICTURE IN VIDEO THAT IS REFERRED TO BY PlayList<br>• IN ADDITION, WHEN VALUE OF ref_thumbnail_index IS OTHER THAN 0xFFFF, THUMBNAIL IMAGE IS STORED IN MENU.THM OF FIG. 29<br>• IN ADDITION, WHEN VALUE OF ref_thumbnail_index IS 0xFFFF, THUMBNAIL IMAGE IS NOT STORED IN MENU.THM OF FIG. 29. IN THIS CASE, PLAYER MAY DECODE PICTURE THAT IS DESIGNATED BY Presentation time stamp IN VIDEO THAT IS REFERRED TO BY PlayList<br>• NUMBER OF MARK TYPE VALUE 0x01 OR 0x02 OF PlayListMark() IS 0 OR 1 |
| 0x02 | THIS MARK IS REPRESENTATIVE IMAGE OF PlayList, AND THIS IMAGE IS NOT SELECTED FROM VIDEO PICTURE THAT IS REFERRED TO BY PlayList | • IT IS NECESSARY FOR VALUE OF ref_thumbnail_index TO BE OTHER THAN 0xFFFF. THUMBNAIL IMAGE IS STORED IN MENU.THM OF FIG. 29<br>• ZERO IS SET TO mark_time_stamp AND PlayItem_id<br>• NUMBER OF MARK TYPE VALUE 0x01 OR 0x02 OF PlayListMark() IS 0 OR 1 |
| 0x03 | Resume-mark | • REPRODUCTION RESUME POINT. IT IS NECESSARY FOR NUMBER OF REPRODUCTION RESUME POINTS THAT ARE DEFINED IN PlayListMark() TO BE 0 OR 1 |
| 0x04 | Book-mark | • REPRODUCTION ENTRY POINT OF PlayList. THIS MARK MAY BE SET BY USER AND IS USED, FOR EXAMPLE, AS MARK THAT DESIGNATES STARTING POINT OF PREFERABLE SCENE |
| 0x06 | Skip-start-mark | • SKIP MARK POINT. PLAYER SKIPS PROGRAM FROM THIS POINT TO END OF PROGRAM. IT IS NECESSARY FOR NUMBER OF SKIP MARK POINTS THAT ARE DEFINED IN PlayListMark() TO BE 0 OR 1 |

FIG. 29

| Syntax | No. of bits | Mnemonics |
|---|---|---|
| MENU.THM/MARK.THM { | | |
|     reserved | 256 | bslbf |
|     Thumbnail() | | |
|     for(i=0; i<N1; i++) | | |
|         padding_word | 16 | bslbf |
| } | | |

FIG. 30

| Syntax | No. of bits | Mnemonics |
|---|---|---|
| Thumbnail() { | | |
|     version_number | 8*4 | char |
|     length | 32 | uimsbf |
|     if (length != 0) { | | |
|         tn_blocks_start_address | 32 | bslbf |
|         number_of_thumbnails | 16 | uimsbf |
|         tn_block_size | 16 | uimsbf |
|         number_of_tn_blocks | 16 | uimsbf |
|         reserved | 16 | bslbf |
|         for(j=0; j<number_of_thumbnail; j++) { | | |
|             thumbnail_index | 16 | uimsbf |
|             thumbnail_picture_format | 8 | bslbf |
|             reserved | 8 | bslbf |
|             picture_data_size | 32 | uimsbf |
|             start_tn_block_number | 16 | uimsbf |
|             x_picture_length | 16 | uimsbf |
|             y_picture_length | 16 | uimsbf |
|             reserved | 16 | uimsbf |
|         } | | |
|         stuffing_bytes | 8*2*L1 | bslbf |
|         for(k=0; k<number_of_tn_blocks; k++) { | | |
|             tn_block | tn_block_size* 1024*8 | |
|         } | | |
|     } | | |
| } | | |

INFORMATION PROCESSING DEVICE, INFORMATION PROCESSING METHOD, AND PROGRAM

CROSS-REFERENCE TO RELATED APPLICATION

The present application is a national phase entry under 35 U.S.C. §371 of International Application No. PCT/JP2012/007584 filed Nov. 27, 2012, published on Jun. 6, 2013 as WO 2013/080517 A1, which claims priority from Japanese Patent Application No. JP 2011-260279, filed in the Japanese Patent Office on Nov. 29, 2011.

TECHNICAL FIELD

The present disclosure relates to an information processing device, an information processing method, and a program, and more particularly, to an information processing device, an information processing method, and a program, in which contents may be quickly deleted.

Background Art

In recent years, recording and reproducing devices are widely spread, and it is generally performed that an AV (Audio Visual) signal that is broadcasted is recorded on a disc and is reproduced at a user's desired timing. This AV signal is digitalized and thus compression thereof is possible, and AV signals corresponding to a long period of time may be recorded on the disc.

However, as a recording medium that stores contents including the AV signal, in addition to discs (disks) such as a Blu-Ray disc, a DVD (Digital Versatile Disc), and a hard disk, semiconductor memories such as a flash memory card are used.

A capacity of this recording medium is increased and a signal is digitalized, such that increasingly numerous contents maybe recorded on the recording medium. As a result, the number of contents that may be recorded on a recording medium, and more specifically, the number of PlayLists is significantly increased to substantially 10,000 or more compared to at most 200 up to now.

A technology of managing the contents that are recorded on the recording medium with a PlayList and a Clip is disclosed in JP-A-2002-158972. The Clip is data as an actual state of the contents, and the PlayList designates a predetermined period of the Clip. For example, when a user gives an instruction with respect to contents to be reproduced, actually, the PlayList is designated. In addition, a range that is referred to by the PlayList of the Clip is reproduced.

SUMMARY

Technical Problem

One Clip may be referred to by two or more PlayLists. A referred range may be common, or may be different in each case. When the Clip as data that is an actual state of the contents, and the PlayList as the reproduction range thereof are managed independently, content data as the actual state in which an amount of data is large is prevented from being recorded in a duplicate manner. As a result thereof, a recording capacity of the recording medium may be effectively used.

As a result, when deletion of one PlayList is instructed, a corresponding Clip may not be deleted immediately. Whether or not the Clip is referred to by another PlayList is investigated, and only in a case the Clip is not referred to by another PlayList, the Clip may be deleted.

However, as the number of PlayList increases, in a case where the deletion of the PlayList recorded on the recording medium is instructed, it takes a long time to investigate whether or not the corresponding Clip is referred to by another PlayList. As a result, it is difficult to quickly delete the PlayList, that is, the contents.

It is therefore desirable to quickly delete contents.

Solution to Problem

An embodiment of the present disclosure is directed to an information processing device including a controller. The controller may control generation or alteration of a first reproduction information according to a flag. The flag may indicate whether a content file referred to by the first reproduction information is referred to by second reproduction information.

Alteration of the first reproduction information may include dividing the first reproduction information. In response to dividing the first reproduction information, the flag may be set to indicate that the content file referred to by the first reproduction information is referred to by the second reproduction information.

Alteration of the first reproduction information may include combining the first reproduction information with other reproduction information. In response to combining the reproduction information with the other reproduction information, the flag may be set to indicate that the content file referred to by the first reproduction information is not referred to by the second reproduction information.

In response to generation of the first reproduction information, the flag may be set to indicate that the content file referred to by the first reproduction information is not referred to by the second reproduction information.

In the event that the content file referred to by the first reproduction information is referred to by the second reproduction information, the flag may be set to a binary value of one.

In the event that the content file referred to by the first reproduction information is referred to by the second reproduction information, the content file may not be deleted in response to an instruction to delete the first reproduction information.

In the event that the content file referred to by the first reproduction information is not referred to by the second reproduction information, the flag may be set to a binary value of zero.

In the event that the content file referred to by the first reproduction information is not referred to by the second reproduction information, the content file may be deleted in response to an instruction to delete first reproduction information. The first reproduction information may be a first play list file or a first index, and the second reproduction information may be a second play list file or a second index.

Another embodiment of the present disclosure is directed to an information processing device including a controller. In response to receiving an instruction to delete a first reproduction information, the controller may access a first flag associated with the first reproduction information. The first flag may indicate whether to delete both the first reproduction information and a first content file referred to by the first reproduction information. In the event that the first flag indicates that both the first reproduction information and the first content file are to be deleted in response to the instruction to delete the first reproduction information, the controller may control deletion of the first reproduction information and the first content file.

In the event that the first flag indicates that the first content file is not to be deleted in response to the instruction to delete the first reproduction information, the controller may access a second flag associated with second reproduction information that indicates that a second content file referred to by the second reproduction information is referred to by third reproduction information.

The second reproduction information is not referred to by the first reproduction information.

The first flag may indicate that the first content file is not to be deleted in the event that the first content file is referred to by the second reproduction information.

Another embodiment of the present disclosure is directed to an information processing device including a controller. In response to an instruction to alter a first content file referred to by first reproduction information, the controller may determine whether the instruction corresponds to a deleting operation to delete the first content file, a combining operation to combine the first content file with a second content file, or a dividing operation to divide contents of the first content file. In the event that the instruction corresponds to the deleting operation, the combining operation, or the dividing operation, a value of a flag of the first reproduction information may be set to indicate that the first content file is referred to by second reproduction information.

In the event that the value of the flag indicates that the first content file is referred to by the second reproduction information, the first content file may not be deleted in response to an instruction to delete the first reproduction information.

Another embodiment of the present disclosure is directed to an information processing device including a controller. In the event that a content file referred to by first reproduction information is marked for deletion, the controller may cause a value of a flag to be changed. The flag may indicate whether the content file is referred to by second reproduction information.

Another embodiment of the present disclosure is directed to an information processing method that corresponds to the information processing device.

Advantageous Effects

According to the embodiments of the present disclosure, contents may be quickly deleted.

BRIEF DESCRIPTION OF DRAWINGS

FIG. 4 is a diagram explaining a Real PlayList and a Virtual PlayList.

FIG. 7 is a diagram explaining assemble editing.

FIG. 8 is a diagram explaining a case in which a sub-path is provided to the Virtual PlayList.

FIG. 16 is a diagram illustrating a display example of a title list.

FIG. 17 is a diagram illustrating the syntax of NDEX.BAV file.

FIG. 18 is a diagram illustrating the syntax of INFO.BAV file.

FIG. 19 is a diagram illustrating the syntax of ExtensionData( ).

FIG. 20 is a diagram illustrating an example of the syntax of ExtensionData( ).

FIG. 21 is a diagram illustrating the syntax of PL_to_Clip_table( ).

FIG. 22 is a diagram illustrating the syntax of xxxxx.RPL and xxxxx.VPL.

FIG. 24 is a diagram illustrating the syntax of the PlayList.

FIG. 25 is a diagram illustrating the syntax of UIAppInfoPlayList.

FIG. 26 is a diagram illustrating the syntax of PlayItem.

FIG. 27 is a diagram illustrating the syntax of PlayListMark.

FIG. 28 is a diagram illustrating a table of mark_type.

FIG. 29 is a diagram illustrating the syntax of MENU.THM/MARK.THM.

FIG. 30 is a diagram illustrating the syntax of Thumbnail.

DESCRIPTION OF EMBODIMENTS

Hereinafter, embodiments to implement the present disclosure (hereinafter, referred to as "embodiments") will be described. In addition, the description will be made in the following order.

1. Configuration of Recording and Reproducing Device
2. Editing of AV Stream
3. Functional Configuration of Control Unit
4. Explanation of Operation
5. PlayList
6. Editing of Real PlayList
7. Operation of Virtual PlayList
8. Re-editing of Virtual PlayList
9. Mark
10. Thumbnail
11. CPI
12. Directory and File
13. INDEX.BAV File
14. INFO.BAV
15. ExtensionData( )
16. PL_to_Clips_table( )
17. Real PlayList File and Virtual PlayList File
18. Syntax of PlayList
19. UIAppInfoPlayList
20. Syntax of PlayItem
21. PlayListMark( )
22. MENU.THM
23. AV Stream File
24. Recording Process 1
25. Contents Deleting Process
26. Editing Example 1
27. Recording Process 2
28. Editing Example 2
29. Application of Embodiment of Present Disclosure to Program
30. Others

[Configuration of Recording and Reproducing Device]

Figure 1:
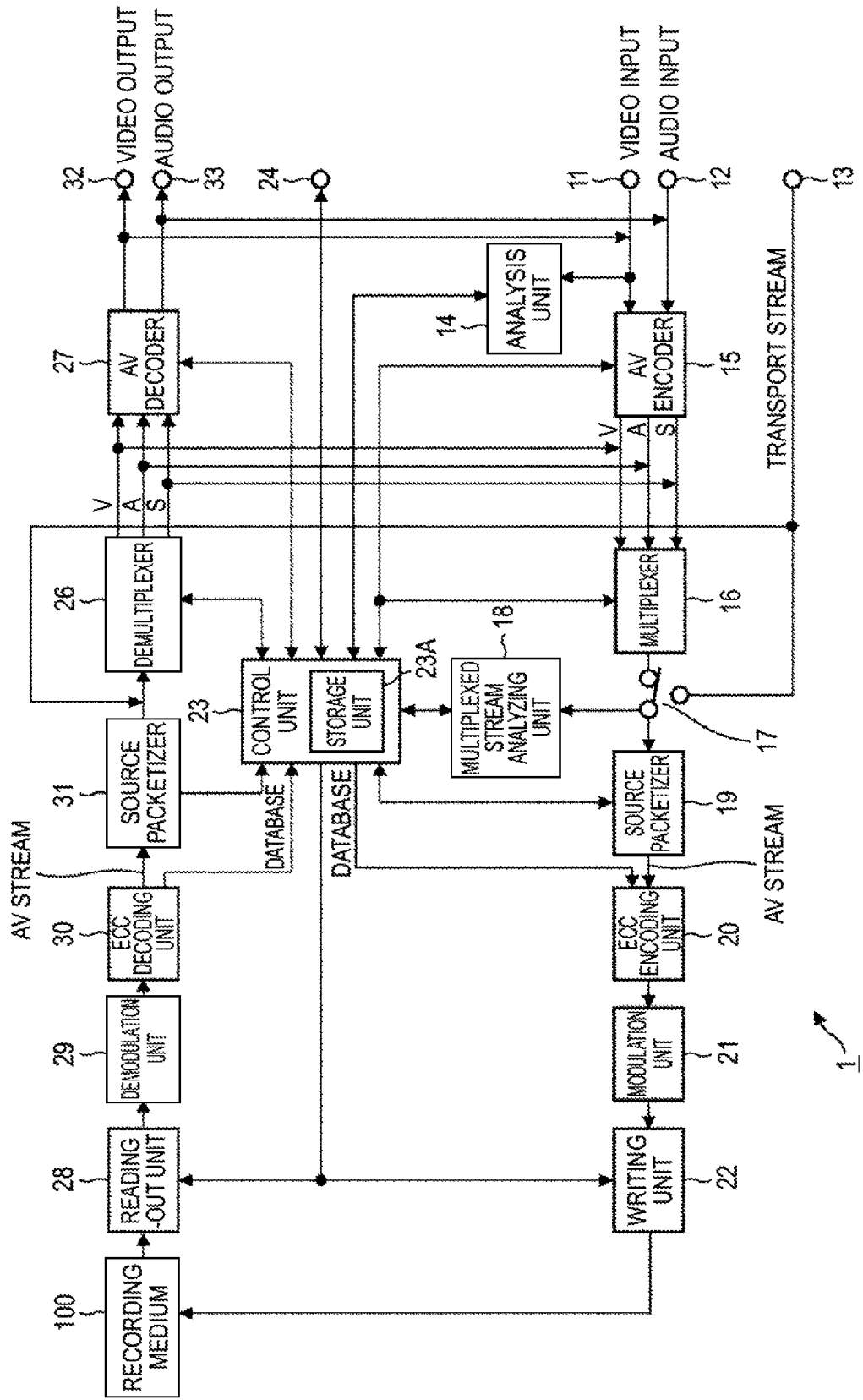
FIG. 1 is a diagram illustrating a configuration of an information processing device according to an embodiment of the present disclosure.

Hereinafter, embodiments of the present disclosure will be described with reference to the attached drawings. FIG. 1 shows a diagram illustrating an internal configuration example of an information processing device according to an embodiment of the present disclosure. First, a description will be made with respect to a configuration of a part that performs an operation of recording a signal input from the outside in a recording medium. As an information processing device that executes at least one of recording of information and reproduction thereof, a recording and reproducing device 1 is configured in such a manner that analog data or digital data may be input thereto and may be recorded therein.

An analog video signal is input to a terminal 11, and analog audio signal is input to a terminal 12. The video signal input to the terminal 11 is output to an analysis unit 14 and an AV encoder 15, respectively. The audio signal input to the terminal 12 is output to the AV encoder 15. The analysis unit 14 extracts characteristic points such as a scene change from the input video signal.

The AV encoder 15 encodes the video and audio signals that are input, respectively, and outputs system information (S) such as an encoded video stream (V), an encoded audio stream (A), and AV synchronization to a multiplexer 16.

The encoded video stream is a video stream that is encoded by, for example, a MPEG (Moving Picture Expert Group)-2 method, and the encoded audio stream is an audio stream that is encoded by a MPEG-1 method, an audio stream that is encoded by a Dolby AC3 method, or the like. The multiplexer 16 multiplexes the video and audio streams that are input on the basis of input system information, and outputs the multiplexed streams to a multiplexed stream analysis unit 18 and a source packetizer 19 via a switch 17.

The multiplexed stream is, for example, an MPEG-2 transport stream or a MPEG-2 program stream. The source packetizer 19 encodes the input multiplexed stream to an AV stream including a source packet in accordance with an application format of a recording medium 100 in which the stream is recorded. The AV stream is subjected to a predetermined process by an ECC (error correction) encoding unit 20 and a modulation unit 21 and is output to a writing unit 22. The writing unit 22 writes (that is, records) AV stream files in the recording medium 100 on the basis of a control signal output from a control unit 23. In addition, the recording medium 100 may be configured by semiconductor memories such as a flash memory card in addition to discs (disks) such as a Blu-Ray disc, a DVD (Digital Versatile Disc), and a hard disk.

A transport stream, which is input from a digital interface or a digital television tuner, of digital television broadcasting is input to a terminal 13. As a recording method of the transport stream input to the terminal 13, two methods may be exemplified. That is, a method of recording the transport stream in a transparent way, and a method of recording the transport stream after re-encoding thereof so as to lower a recording bit rate may be exemplified. Instruction information about the recording method is input from a terminal 24 to which a user interface (not shown) is connected to the control unit 23.

In the case of recording the input transport stream in the transparent way, the transport stream that is input to the terminal 13 is output to the multiplexed stream analysis unit 18 and the source packetizer 19. A process until the AV stream is recorded in the recording medium 100 after this output process is the same as the process in the case of encoding the input audio and video signals and of recording the encoded input audio and video signals, such that the description thereof will be omitted.

In the case of recording the input transport stream after re-encoding this stream, the transport stream input to the terminal 13 is input to a demultiplexer 26. The demultiplexer 26 applies a demultiplexing process with respect to the input transport stream, and extracts the video stream (V), the audio stream (A), and the system information (S).

Among streams (that is, plural pieces of information) extracted by the demultiplexer 26, the video stream is output to an AV decoder 27, and the audio stream and the system information are output to the multiplexer 16, respectively. The AV decoder 27 decodes the input video stream, and output a reproduction video signal thereof to the AV encoder 15. The AV encoder 15 encodes the input video signal and outputs an encoded video stream (V) to the multiplexer 16.

On the other hand, the audio stream and the system information that are output from the demultiplexer 26 and that are input to the multiplexer 16, and the video stream that is output from the AV encoder 15 are multiplexed on the basis of input system information and are output to the multiplexed stream analysis unit 18 and the source packetizer 19 via the switch 17 as a multiplexed stream. A process until the AV stream is recorded in the recording medium 100 after this output process is the same as the process in the case of encoding the input audio and video signals and of recording the encoded input audio and video signals, such that the description thereof will be omitted.

The recording and reproducing device 1 according to the embodiment of the present disclosure records the AV stream files in the recording medium 100 and also records application database information describing this file. The application database information is created by the control unit 23. The information input to the control unit 23 includes characteristic information of a moving image from the analysis unit 14, characteristic information of the AV stream from the multiplexed stream analysis unit 18, and instruction information, which is input from the terminal 24, from a user.

The characteristic information of the moving image that is supplied from the analysis unit 14 is information that relates to a characteristic image in the input moving image signal, and includes, for example, designated information (for example, a mark) such as a starting point of a program, a change point of a scene, and initiation and termination points of a commercial (CM). In addition, the characteristic information also includes thumbnail image information of an image at the designated site.

The characteristic information of the AV stream from the multiplexed stream analysis unit 18 is information that relates to encoding information of the AV stream that is recorded, and includes, for example, address information of an I picture in the AV stream, an encoding parameter of the AV stream, change point information of the encoding parameter in the AV stream, information (for example, a mark) related to a characteristic image in the video stream, and the like.

The user's instruction information from the terminal 24 includes designation information of a reproduction section, which is designated by a user, in the AV stream, character letters that explain the contents of the reproduction section, a bookmark that is set to a preferable scene by a user, information of a resume point, and the like.

For example, the control unit 23 that is made up by, for example, a microprocessor unit includes a storage unit 23A that stores predetermined information. The control unit 23 creates a database (Clip) of the AV stream, a database of a grouped one (PlayList) of a reproduction section (PalyItem) of the AV stream, management information (INFO.BAV) of the recorded contents of the recording medium 100, and information of the thumbnail image on the basis of the input information. Application database information including these kinds of information are processed by the ECC encoding unit 20 and the modulation unit 21 similarly to the AV stream, and are input to the writing unit 22. The writing unit 22 records database file in the recording medium 100 on the basis of the control signal output from the control unit 23.

Details of the above-described application database information will be described later.

In this manner, in a case where the AV stream files (that is, files of image data and voice data) that are recorded on the recording medium 100, and the application database information are reproduced, the following processes are performed. First, the control unit 23 gives an instruction to a reading-out unit 28 so as to read out the application database information from the recording medium 100. Then, the reading-out unit 28 reads out the application database information from the recording medium 100, and this application database information is input to the control unit 23 after undergoing a process in a demodulation unit 29 and an ECC decoding unit 30.

The control unit 23 outputs a list of PlayLists (that is, a list of contents) that is recorded on the recording medium 100 on the basis of the application database information to the terminal 24 to which a user interface I/O is connected. In addition, the list of the PlayLists may be output to a display (not shown) from a terminal 32 as a video output. When a user selects a PlayList (that is, contents) which the user desires to reproduce from the list of PlayLists, information related to Playlist in which reproduction is designated is input from the user interface I/O of the terminal 24 to the control unit 23. The control unit 23 gives an instruction to the reading-out unit 28 so as to read out the AV stream file that is necessary to reproduce the PlayList. The reading-out unit 28 reads out a corresponding AV stream from the recording medium 100 and outputs this AV stream to the demodulation unit 29. The AV stream input to the demodulation unit 29 is subjected to a predetermined process, and is output to a source packetizer 31 after undergoing a further process by the ECC decoding unit 30.

The list of PlayLists is displayed even when a user gives an instruction about deletion of the PlayList. A user designates a specific PlayList to be deleted in the displayed list.

The source packetizer 31 converts the AV stream of an application format, which is readout from the recording medium 100 and to which a predetermined process is performed, to a stream that may be output to the demultiplexer 26. The demultiplexer 26 outputs system information (S) such as the video stream (V), the audio stream (A), and the AV synchronization that make up the reproduction section (that is, PlayItem) of the AV stream that is designated by the control unit 23 to the AV decoder 27. The AV decoder 27 decodes the video stream and the audio stream, and outputs a reproduction video signal and a reproduction audio signal from corresponding terminals 32 and 33, respectively.

In addition, in a case where information that instructs random access reproduction or special reproduction is input from the terminal 24 as the user interface, the control unit 23 determines a reading-out site of the AV stream from the recording medium 100 on the basis of the contents of the database (Clip) of the AV stream, and gives an instruction of reading-out of the AV stream to the reading-out unit 28. For example, in a case where the PlayList that is selected by the user is reproduced from a predetermined time, the control unit 23 give an instruction to the reading-out unit 28 so as to read out data from I picture having a time stamp that is closest to a designated time.

In addition, when receiving instruction of high-speed reproduction (Fast-forward playback) from a user, the control unit 23 gives an instruction to the reading-out unit 28 on the basis of the database (Clip) of the AV stream so as to sequentially and continuously read out I-picture data in the AV stream.

The reading-out unit 28 reads out data of the AV stream from the designated random access point, and the read-out data is reproduced after undergoing a process in each subsequent stage unit.

[Editing of AV Stream]

Next, a description will be made with respect to a case in which a user edits the AV stream that is recorded on the recording medium 100. In a case where the user desires to create a new reproduction path by designating a reproduction section of the AV stream that is recorded on the recording medium 100, for example, in a case where the user desires to create a reproduction path in which the user desires to reproduce a section of a singer "a" of a popular song program called program A, and then the user desires to continuously reproduce a section of the singer "a" of a popular song program called program B, information about an initiation point (an in-point) and a termination point (an out-point) of the reproduction section is input to the control unit 23 from the terminal 24 as the user interface. The control unit 23 creates a database of the grouping of a (PlayList) in which the reproduction sections (PlayItem) of the AV stream are grouped.

In a case where the user desires to delete a part of the AV stream that is recorded on the recording medium 100, information about an in-point and an out-point of a deleting section is input from the terminal 24 as the user interface to the control unit 23. The control unit 23 changes the database of the PlayList so as to refer to only a necessary AV stream portion. In addition, the control unit 23 gives an instruction to the writing unit 22 so as to delete unnecessary stream portions of the AV stream.

Next, a description will be made with respect to a case in which the user desires to create a new reproducing path by designating a reproduction section of the AV stream that is recorded on the recording medium 100, and the user desires to seamlessly connect to each reproduction section. In this case, the control unit 23 creates a database of a grouped one (PlayList) in which reproduction sections (PlayItem) of the AV stream are grouped, and performs partial re-encoding and re-multiplexing of the video stream in the vicinity of a connection point of the reproduction section.

First, information about a picture at the in-point of the reproduction section and information about a picture at the out-point are input from the terminal 24 to the control unit 23. The control unit 23 gives an instruction of reading-out data necessary for reproducing the in-point side picture and the out-point side picture to the reading-out unit 28. In addition, the reading-out unit 28 reads out data from the recording medium 100, and this data is output to the demultiplexer 26 after passing through the demodulation unit 29, the ECC decoding unit 30, and the source packetizer 31.

The control unit 23 analyzes the data input to the demultiplexer 26, determines a re-encoding method (changing of picture coding type and allocation of an amount of encoding bits that are re-encoded) of the video stream and a re-multiplexing method, and supplies these methods to the AV encoder 15 and the multiplexer 16.

Next, the demultiplexer 26 separates the input stream into the video stream (V), the audio stream (A), and the system information (S). The video stream includes "data that is input to the AV decoder 27" and "data that is input to the multiplexer 16". The former data is data necessary for the re-encoding, and this data is decoded by the AV decoder 27, and the decoded picture is re-encoded by the AV encoder 15 and becomes a video stream. The latter data is data that is not re-encoded, and is copied from an original stream. The audio stream and the system information are directly input to the multiplexer 16.

The multiplexer 16 multiplexes the input stream on the basis of the information input from the control unit 23, and outputs the multiplexed stream. The multiplexed stream is processed by the ECC encoding unit 20 and the modulation unit 21 and is input to the writing unit 22. The writing unit 22 records the AV stream in the recording medium 100 on the basis of the control signal supplied from the control unit 23.

[Functional Configuration of Control Unit]

Figure 2:
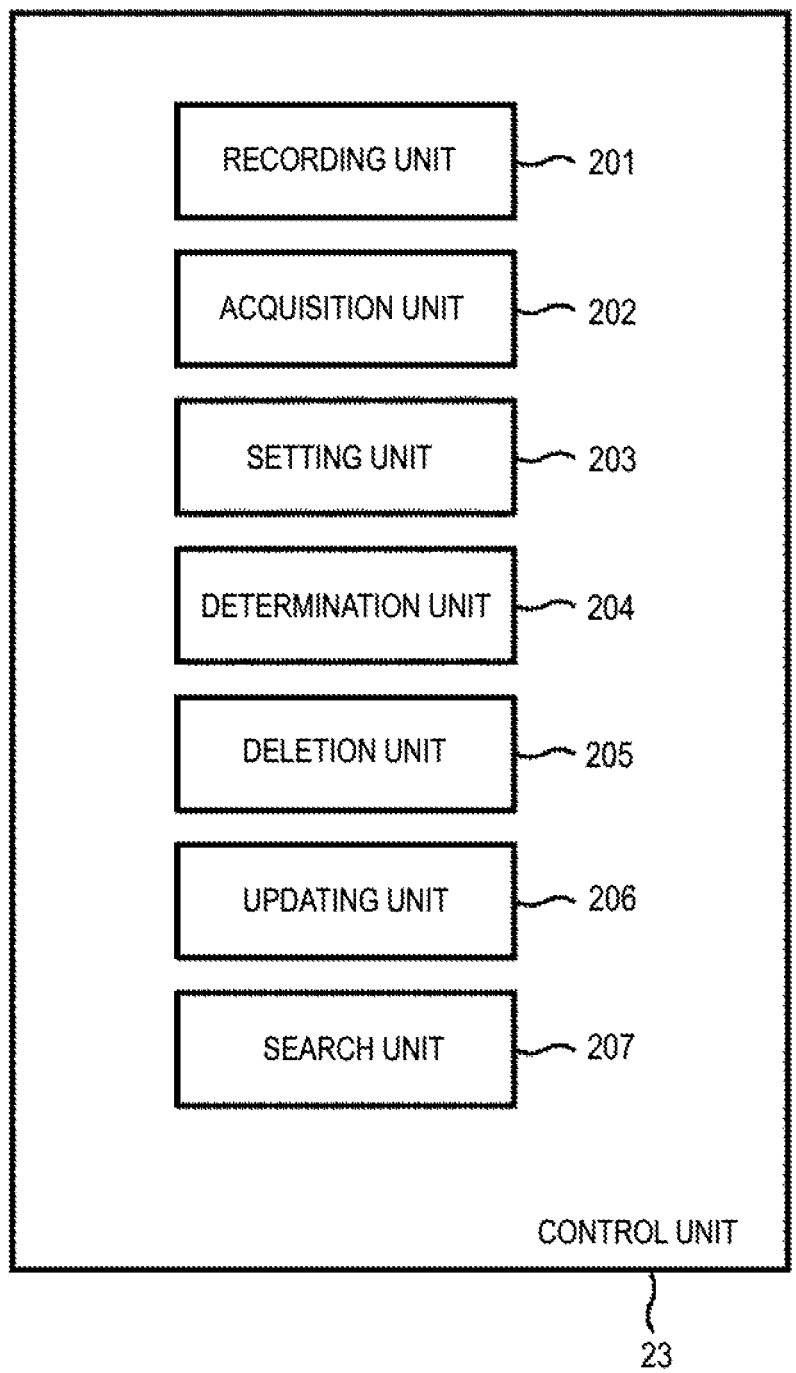
FIG. 2 is a block diagram illustrating a functional configuration of a control unit.

FIG. 2 shows a block diagram illustrating a functional configuration of the control unit 23. In this embodiment, the control unit 23 includes a recording unit 201, an acquisition unit 202, a setting unit 203, a determination unit 204, a deletion unit 205, an updating unit 206, and a search unit 207. These respective units may be configured, for example, by hardware or software.

The recording unit 201 records various kinds of information. The acquisition unit 202 acquires various kinds of information. The setting unit 203 sets predetermined information. The determination unit 204 performs a determination process. The deletion unit 205 deletes predetermined information. The updating unit 206 updates predetermined information. The search unit 207 searches predetermined information.

[Explanation of Operation]

Figure 3:
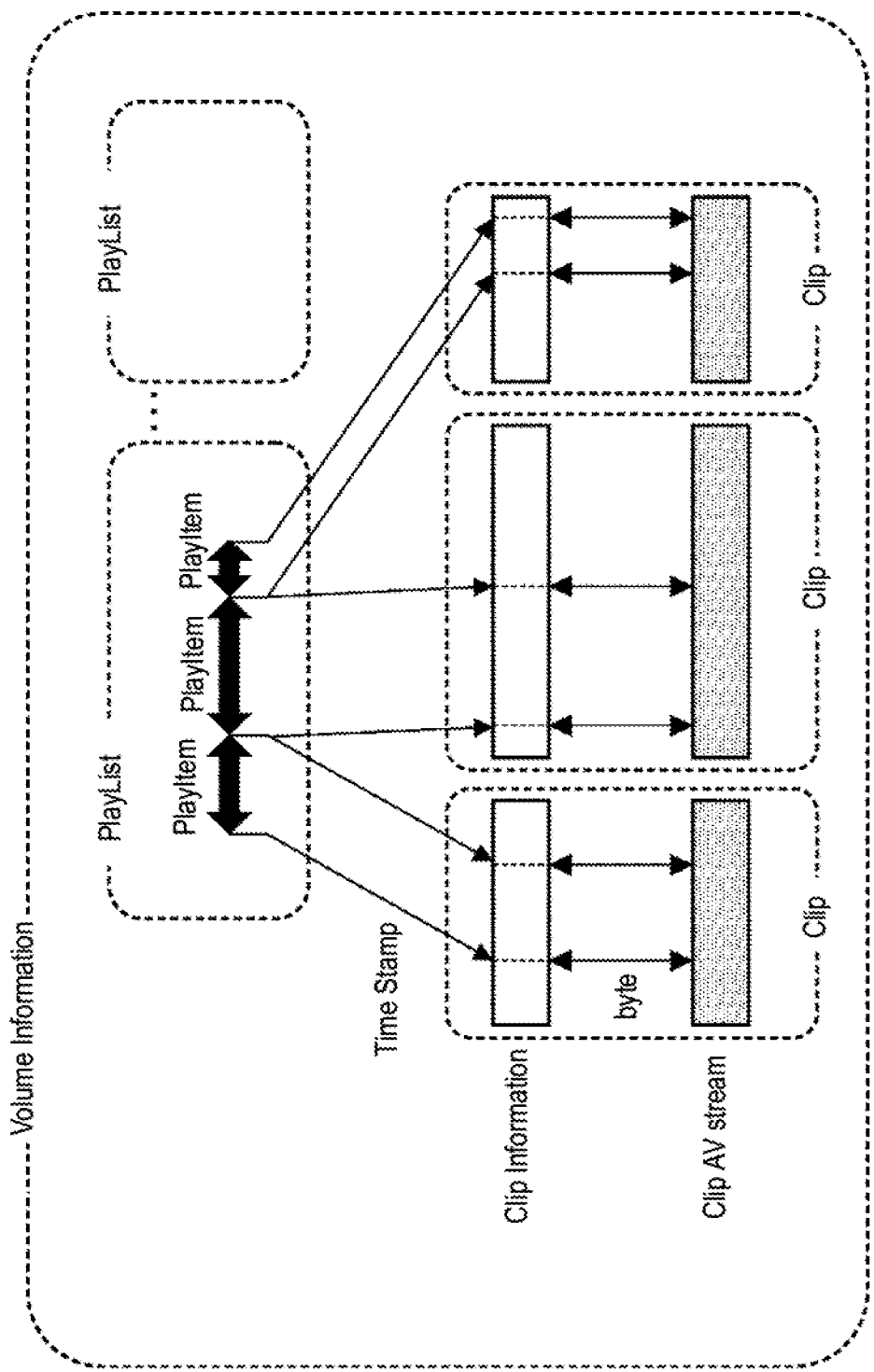
FIG. 3 is a diagram explaining a format of data that is recorded on a recording medium by a recording and reproducing device.

Hereinafter, a description will be made with respect to the application database information or operation of reproduction and editing on the basis of this information. FIG. 3 shows a diagram explaining a structure of an application format. The application format includes two layers of PlayList and Clip so as to manage the AV stream. Volume Information manages the entirety of Clip and PlayList in a disc. Here, a pair of one AV stream and auxiliary information thereof is considered as one object and is called a Clip. An AV stream file is called a Clip AV stream file, and auxiliary information thereof is called a Clip Information file. That is, the Clip is actual state information as an actual state of contents, and the PlayList is reproduction information that designates reproduction of the actual state information.

One Clip AV stream file stores data in which an MPEG-2 transport stream is arranged in a structure that is defined by an application format. In general, a file is treated with a byte sequence, but contents of the Clip AV stream file is expanded on the time axis and an entry point in the Clip is mainly designated on time base. When a time stamp of an access point to predetermined Clip is given, the Clip Information file is useful for finding address information from which reading-out of data is to be started in the Clip AV stream file.

[PlayList]

A PlayList will be described with reference to FIG. 4. The PlayList is provided so that a user may select a reproduction section which the user desires to view in the Clip and the user may simply edit the reproduction section. One PlayList is a collection of reproduction sections in the Clip. One reproduction section in predetermined Clip is called PlayItem, and is expressed as a pair of an in-point (IN) and an out-point (OUT) on the time axis. Therefore, the playlist is configured by a collection of a plurality of PlayItems.

There are two types of PlayList. One of the PlayList types is a Real PlayList, and the other PlayList type is a Virtual PlayList. The Real PlayList shares a stream portion of a Clip that is referred to by the Real PlayList. That is, the Real PlayList occupies a data capacity corresponding to the stream portion of the Clip that is referred to by the Real PlayList in the disc. In a case where the Real PlayList is deleted, data of the stream portion of the Clip that is referred to by the Real PlayList is also deleted.

The Virtual PlayList does not share data of the Clip. Therefore, even when the Virtual PlayList is changed or deleted, any variation does not occur in the contents of the Clip.

[Editing of Real PlayList]

Figure 5A:
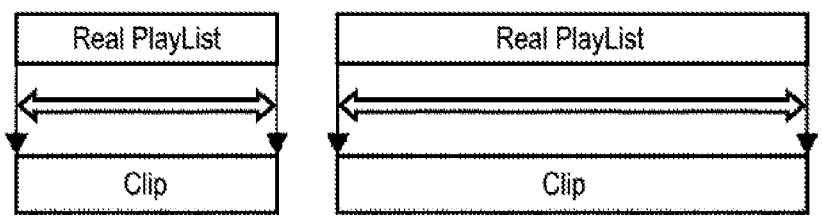
FIGS. 5A to 5C are diagrams explaining creation of the Real PlayList.

Next, a description will be made with respect to editing of the Real PlayList. FIG. 5A shows a diagram relating to creation of the Real PlayList. This creation is an operation of newly creating the Real PlayList that refers to the entirety of the Clip in a case where the AV stream is recorded as a new Clip.

Figure 5B:
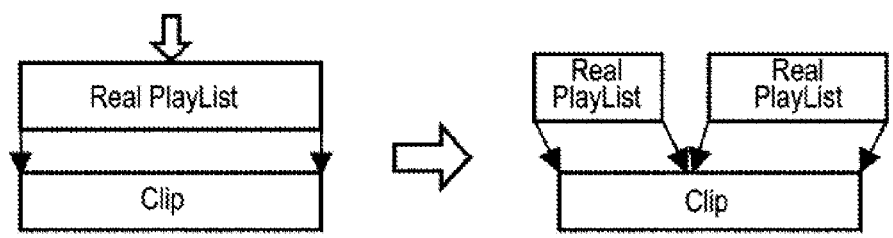

FIG. 5B shows a diagram relating to division of the Real PlayList. This division is an operation of dividing the Real PlayList into two Real PlayLists by dividing the Real PlayList at a desired point. For example, this division operation is performed in a case where two programs are managed in one clip managed by one PlayList and the user desires to register (record) the programs as separate individual programs. This operation does not lead to change of the contents of Clip (the Clip itself is divided).

Figure 5C:
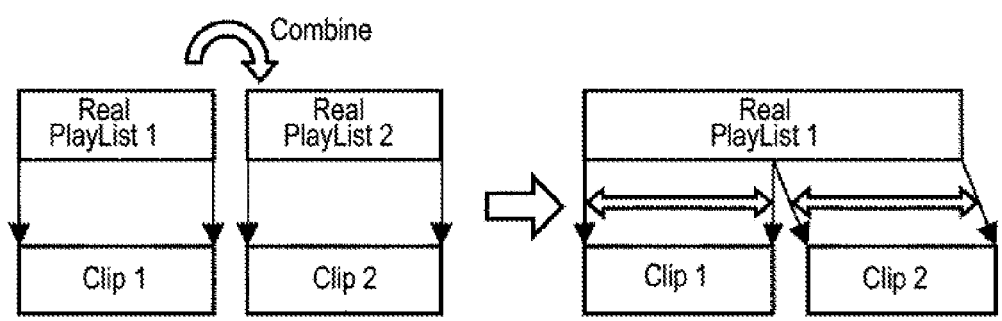

FIG. 5C shows a diagram relating to combination of the Real PlayList. This combination is an operation of combining two Real PlayLists into a new Real PlayList. This combination operation is performed, for example, when the user desires to re-register two programs as one program. This operation does not lead to change of the contents of Clip (the Clips themselves are combined into one).

Figure 6A:
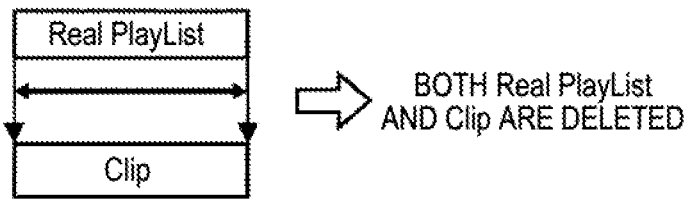
FIGS. 6A to 6C are diagrams explaining deletion of the Real PlayList.

FIG. 6A shows a diagram relating to deletion of the entirety of Real PlayList. In a case where an operation of deleting the entirety of a predetermined Real PlayList is performed, a corresponding stream portion of the Clip that is referred to by the deleted Real PlayList is also deleted.

Figure 6B:
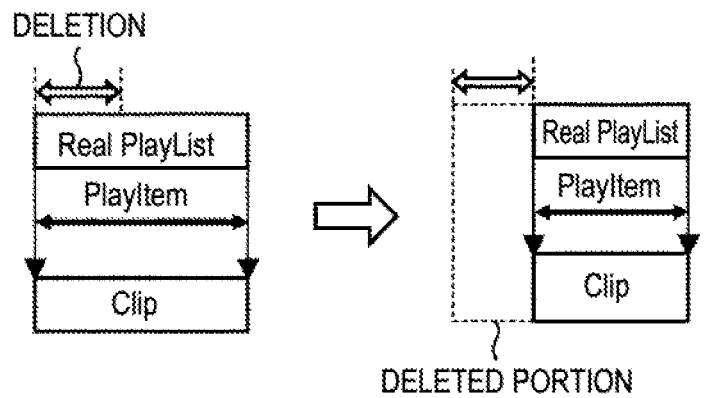

FIG. 6B shows a diagram relating to partial deletion of the Real PlayList. In a case where a desired portion of the Real PlayList is deleted, the corresponding PlayItem is changed to refer to only a necessary stream portion of the Clip. In addition, a corresponding stream portion of the Clip is deleted.

Figure 6C:
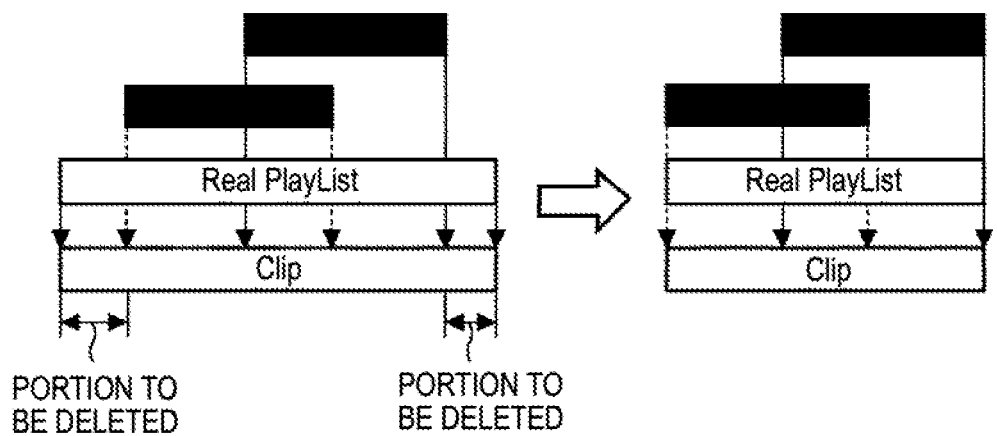

FIG. 6C shows a diagram relating to minimizing of the Real PlayList. This minimizing is an operation of causing the PlayItem corresponding to the Real PlayList to refer to only a stream portion of the Clip, which is necessary for the Virtual PlayList. A corresponding stream portion of the Clip, which is not necessary for the Virtual PlayList, is deleted.

Through the above-described operation, the Real PlayList is changed, and thus in a case where the stream portion of the Clip, which is referred to by the Real PlayList, is deleted, a Virtual PlayList that uses the deleted Clip may present, and thus there is a probability in that a problem may occur due to the deleted Clip in the Virtual PlayList.

In order to prevent this problem from occurring, such a message "There exists a Virtual PlayList referring to the stream portion of the Clip which the Real PlayList refers to, and when the Real PlayList is deleted, the Virtual PlayList itself will also be deleted—is that all right?" is displayed (warning) for the user in response to the user's operation of deletion for confirmation, after which the deletion process is executed or cancelled in response to a user's instruction. Alternatively, the minimizing operation for the Real PlayList is performed in place of deleting the Virtual PlayList.

[Operation for Virtual PlayList]

Next, a description will be made with respect to an operation for the Virtual PlayList. Even though the operation for the Virtual PlayList is performed, the contents of the Clip are not changed. FIG. 7 shows a diagram relating to assemble editing (IN-OUT editing). This is an operation of creating a PlayItem of a reproduction section which the user desires to view to create a Virtual PlayList. A seamless connection between PlayItems is supported by an application format.

As shown in (A) in FIG. 7, in a case where two Real Playlists 1 and 2, and Clips 1 and 2 corresponding to the respective Real PlayLists are present, when the user instructs a predetermined section in the Real PlayList 1 (a section from In1 to Out1: PlayItem 1) as a reproduction section, and a predetermined section (a section from In2 to Out2: PlayItem 2) in the Real PlayList 2 as a successively reproduced section, as shown in (B) in FIG. 7, one Virtual PlayList including the PlayItem 1 and the PlayItem 2 is created.

[Re-Editing of Virtual PlayList]

Next, Re-editing of the Virtual PlayList will be described. The re-editing includes change of an in-point or an out-point in the Virtual PlayList, insertion or append of a new PlayItem into the Virtual PlayList, deletion of the PlayItem in the Virtual PlayList, and the like. In addition, the Virtual PlayList itself may be deleted.

FIG. 8 shows a drawing audio dubbing (post recording) to the Virtual PlayList. This is an operation of registering the audio dubbing to the Virtual PlayList as a sub-path. This audio dubbing is supported by an application format. An auxiliary audio stream is added to the AV stream of the main path of the Virtual PlayList as a sub-path.

Figure 9:
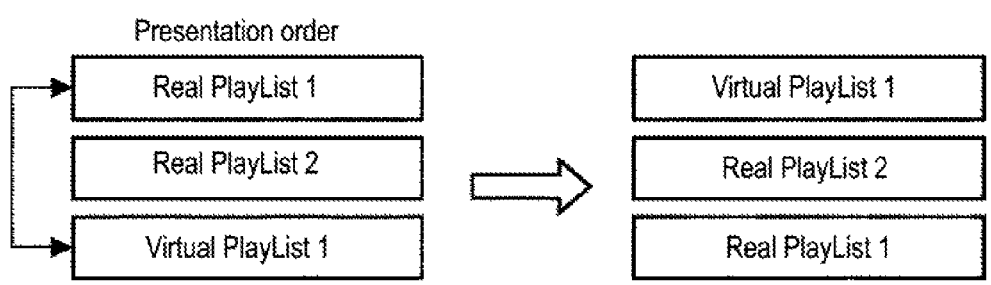
FIG. 9 is a diagram explaining changing of a reproduction sequence of the PlayList.
Figure 10:
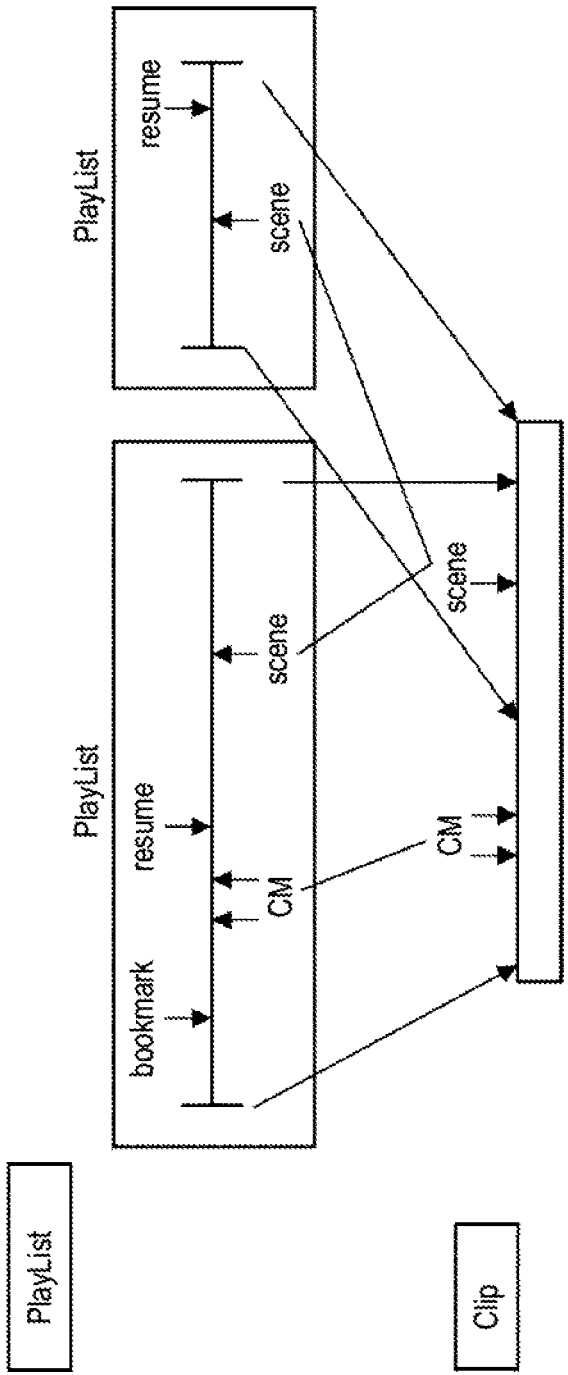
FIG. 10 is a diagram explaining a mark on the PlayList and a mark on the Clip.

As an operation common to the Real PlayList and the Virtual PlayList, changing (moving) of a reproduction sequence of the PlayList as shown in FIG. 9 may be exemplified. This operation is changing of a reproduction sequence of the PlayList in the disc (volume), and is supported by a Table of PlayLists that is defined in the application format. The contents of the Clip are not changed by this operation.

[Mark]

Next, a Mark will be described. The mark is provided for designating a highlight or a characteristic time in the Clip and the PlayList. The mark that is added to the Clip designates a characteristic scene resulting from the contents of the AV stream. For example, scene change point or the like maybe exemplified. When the PlayList is reproduced, the mark of the Clip which the PlayList refers to may be referred to and used.

The mark added to the PlayList is mainly set by a user. For example, a bookmark, a resume point, and the like may be exemplified. The setting of the mark to the Clip or the PlayList is performed by adding a time stamp representing a time of the mark to a mark list. In addition, deletion of the mark includes removal of the time stamp of the mark in the mark list. Therefore, any change does not occur in AV stream through the setting or deletion of the mark.

[Thumbnail]

Next, a thumbnail will be described. The thumbnail is a still image that is added to the Volume, PlayList, and Clip. There are two kinds of thumbnail. One kind of thumbnail is a representative image that represents the content. This thumbnail is mainly used in a menu screen in order for the user to select what the user desires to view by operating a cursor (not shown). Another one is an image representing a scene that is indicated by the mark.

It is necessary for the volume and the respective PlayLists to have a representative image. The representative image of the Volume is assumed to be used for initially displaying a still image representing the contents of the disc when a disc (recording medium 100, hereinafter, the recording medium 100 is supposed to have a disc shape, and is simply referred to as a disc) is set to a predetermined site of the recording and reproducing device 1. The representative image of the PlayList is assumed to be used as a still image representing the contents of the PlayList in a menu screen (a screen of a list of contents) that selects the PlayList.

Figure 11:
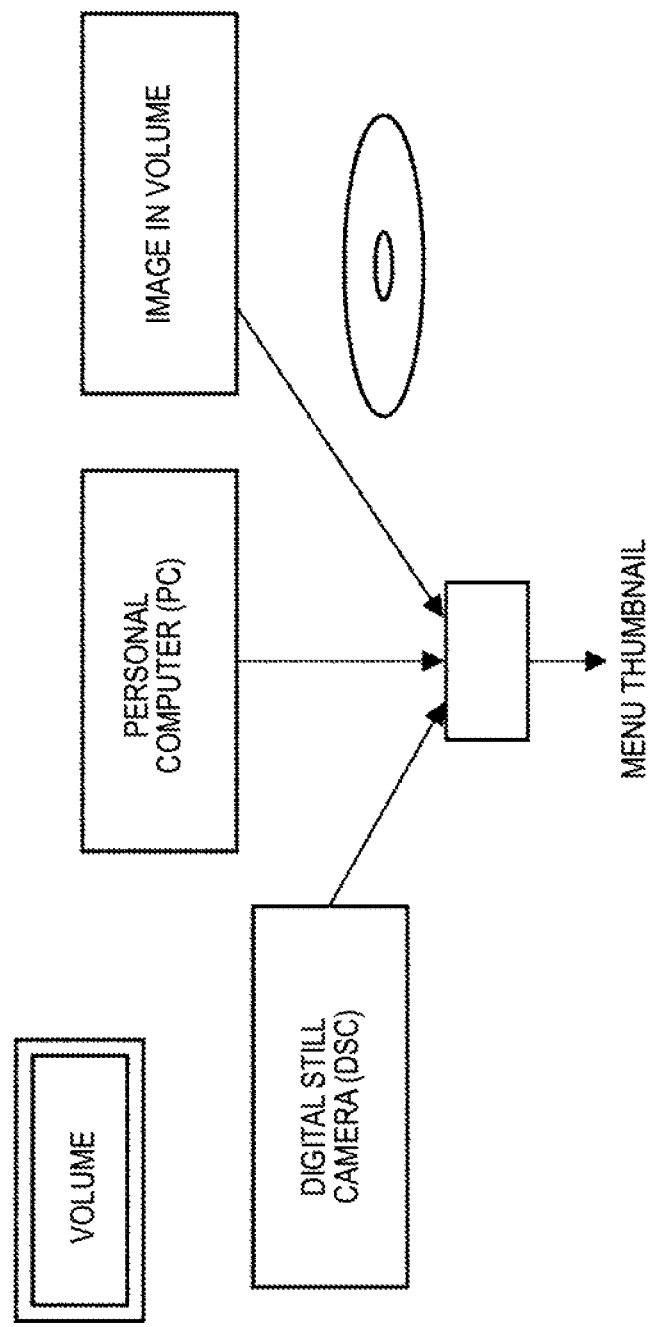
FIG. 11 is a diagram explaining a menu thumbnail.

As the representative image of the PlayList, it may be contemplated to use the initial image of the PlayList as the thumbnail (representative image), but the leading image at a reproduction time of 0 is not necessarily an optimal image representing the contents. Therefore, the user is permitted to set an arbitrary image as the thumbnail of the PlayList. The above-described two kinds of thumbnails are called menu thumbnails. The menu thumbnails are frequently displayed, such that it is necessary for the menu thumbnails to be read out at a high speed from the disc. Therefore, it is effective to store all of the menu thumbnails in one file. The menu thumbnails are not necessarily pictures extracted from moving images in the volume, and may be an image captured from a personal computer or a digital still camera as shown in FIG. 11.

On the other hand, it is necessary for the Clip and the PlayList to be marked with a plurality of marks, and it is necessary to make an image of a mark point be easily viewed so as to grasp the contents at a marked site. The picture representing this mark point is called Mark Thumbnail.

Therefore, the image which is the origin of the thumbnail is mainly an image that is extracted at the mark point instead of an image that is obtained from the outside.

Figure 12:
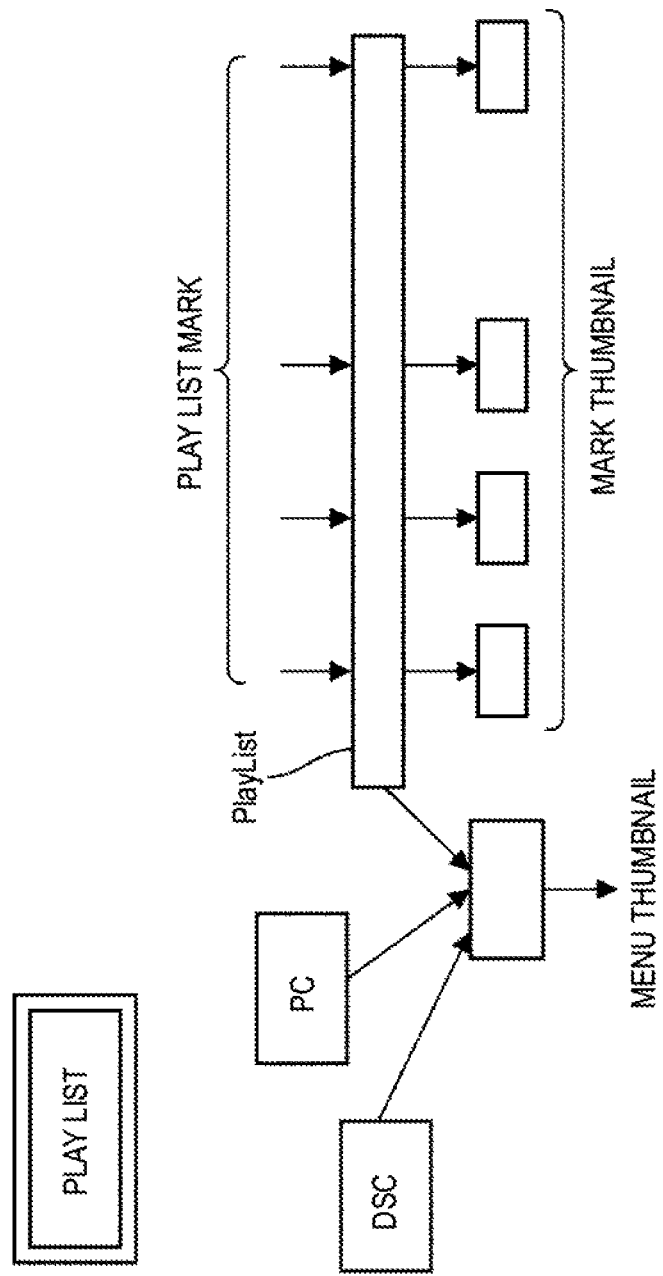
FIG. 12 is a diagram explaining a mark that is added to the PlayList.
Figure 13:
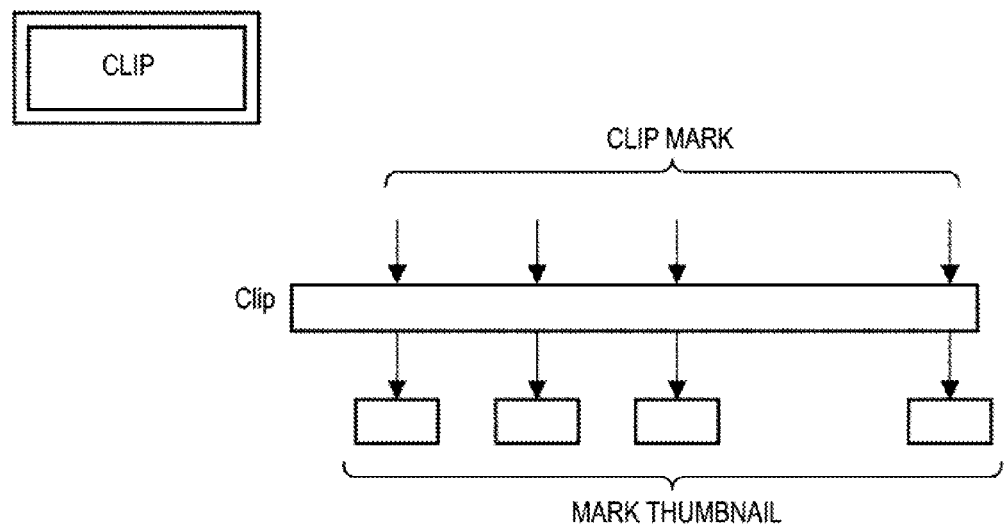
FIG. 13 is a diagram explaining a mark that is added to the Clip.

FIG. 12 shows a diagram illustrating a relationship between a mark that may be added to the PlayList and a mark thumbnail thereof, and FIG. 13 shows a diagram illustrating a relationship between a mark that may be added to the Clip and a mark thumbnail thereof. Differently from the menu thumbnail, the mark thumbnail is used as a sub-menu or the like when showing the details of the PlayList, such that it is not requested to be read out in a short access time. As a result, whenever a thumbnail is necessary, the recording and reproducing device 1 opens a file and reads out a portion of the file, and even when this operation takes some time, there is not a problem.

In addition, for decreasing the number of files present in a volume, it is preferable to store all of the mark thumbnails in one file. The PlayList may have one menu thumbnail and a plurality of mark thumbnails, but it is not necessary for the user to select the Clip directly (usually, the Clip is designated through the PlayList), and thus it is not necessary to provide the menu thumbnails.

Figure 14:
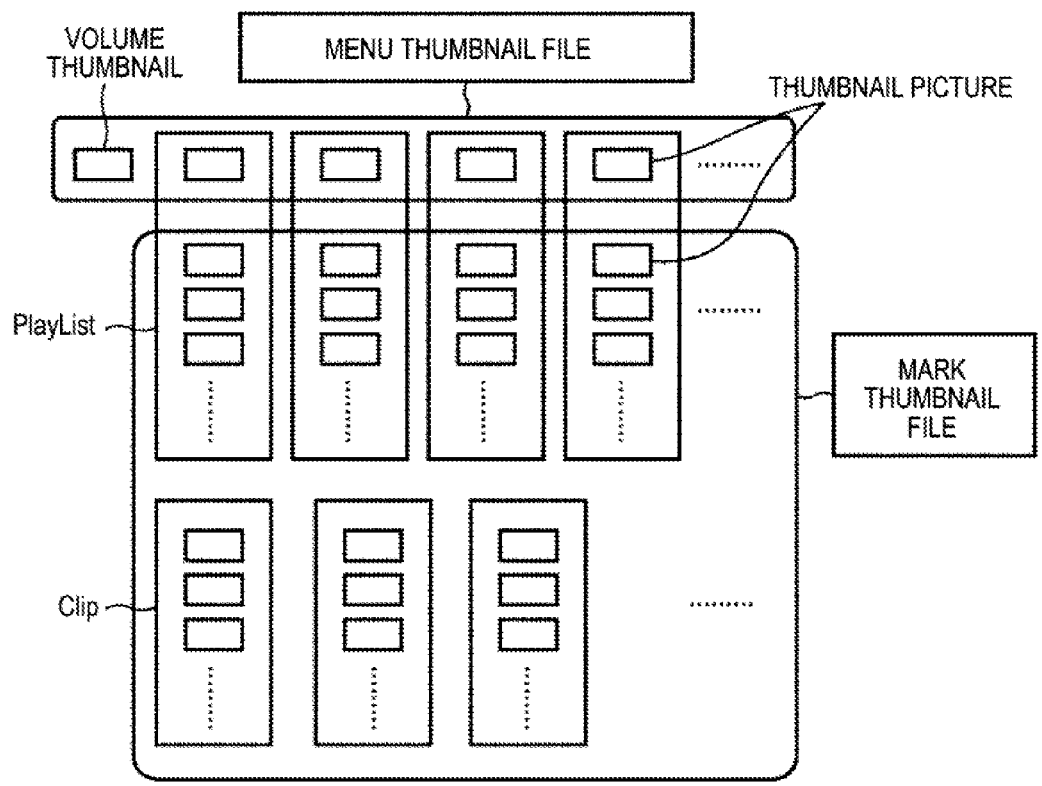
FIG. 14 is a diagram explaining a relationship between the PlayList, the Clip, and a thumbnail file.

FIG. 14 shows a diagram illustrating a relationship between the menu thumbnail, mark thumbnails, PlayList, and Clips when the above-described description is considered. In the menu thumbnail file, a menu thumbnail that is provided for each PlayList is filed. In the menu thumbnail file, a volume thumbnail representing the contents of the data recorded on the disc is included. In the mark thumbnail file, the thumbnail file that is created for each PlayList and each Clip is filed.

[CPI]

Next, CPI (Characteristic Point Information) will be described. The CPI is data that is included in a Clip information file, and is mainly used for finding a data address from which the reading-out of the data in the Clip AV stream file is to be initiated when a time stamp of an access point to the Clip is given. In this embodiment, two kinds of CPI were used. One is an EP_map, and the other is a TU_map.

The EP_map is a list of entry point (EP) data extracted from an elementary stream and a transport stream. The EP_map has address information used to find the site of entry points in the AV stream from which decoding is to be started. One piece of EP data is made up of a pair of a presentation time stamp (PTS) and a data address in the AV stream of an access unit corresponding to the PTS.

The EP_map is used mainly for two purposes. First, it is used for finding a data address in the AV stream in the access unit, which is referred to by the presentation time stamp in the PlayList. Second, the EP_map is used for fast forward playback or fast reverse playback. In a case where the recording and reproducing device 1 records the input AV stream, when the syntax of the stream may be analyzed, the EP_map is created and recorded on the disc.

The TU_map has a list of time unit (TU) data based on the arrival time of the transport packet input through a digital interface. This affords the relationship between the arrival-time-based time and the data address in the AV stream. In a case where the recording and reproducing device 1 records an input AV stream, when the syntax of the stream may not be analyzed, a TU_map is created and recorded on the disc.

STCInfo stores discontinuous point information of STC in the AV stream file which stores the MPEG-2 transport stream. When the AV stream has discontinuous points of STC, the same PTS value may appear in the AV stream file. Thus, when a time on the AV stream is indicated on the PTS basis, it is insufficient to specify the point with only the PTS of the access point. Moreover, an index of the continuous STC section including the PTS is necessary. In this format, the continuous STC section and an index thereof are called an STC-sequence and STC-sequence-id, respectively. STC-sequence information is defined by STCInfo of the Clip Information file. The STC-sequence-id is used in an AV stream file having the EP_map and is optional in the AV stream file having the TU_map.

Programs are a collection of elementary streams and share one system time base for synchronized reproduction of these streams. It is useful for a reproducing device (the recording and reproducing device 1 in FIG. 1) to know the contents of an AV stream before decoding of the AV streams. For example, the contents include values of PID of a transport packet transmitting a video or audio elementary stream, and information about the kinds of video or audio components (for example, an HDTV video or MPEG-2 AAC audio stream), and the like. This information is useful for creating a menu screen that describes the contents of the PlayList referring to the AV stream to a user. In addition, it is useful for setting the initial state of the AV decoder and the demultiplexer of the reproducing device before decoding of the AV stream. For this reason, the Clip Information file has ProgramInfo that describes the program content.

In regard to the AV stream file that stores the MPEG-2 transport stream, program contents may be changed in the file. For example, the PID of the transport packet transmitting the video elementary stream may be changed, or the component type of the video stream may be changed from SDTV to HDTV.

The ProgramInfo stores the information on change points of program contents in the AV stream file. The section of the AV stream file in which the program contents determined by the format remain constant is called a program-sequence. This program-sequence is used in an AV stream file having EP_map and is optional in an AV stream file having TU_map.

In this embodiment, a self-encoding stream format (SESF) is defined. The SESF is used for encoding an analog input signal, and in a case in which a digital input signal (for example, DV) is decoded and then is encoded into an MPEG-2 transport stream.

The SESF defines encoding restriction of an elementary stream with respect to the MPEG-2 transport stream and the AV stream. When the recording and reproducing device 1 encodes and records the SESF stream, an EP_map is created and recorded on the disc.

In regard to a digital broadcast stream, one of the following methods is used for recording the digital broadcast stream on the recording medium 100. First, the digital broadcast stream is transcoded into an SESF stream. In this case, the recorded stream is necessary to conform to SESF. In this case, it is necessary for the EP_map to be created and recorded on the disc.

Alternatively, an elementary stream making up a digital broadcast stream is transcoded to a new elementary stream and re-multiplexed to a new transport stream conforming to the stream format defined by the organization for standardizing the digital broadcast stream. In this case, it is necessary for an EP_map to be created and recorded on the disc.

For example, it is assumed that the input stream is an MPEG-2 transport stream conforming to the ISDB (standard name of digital BS broadcasting of Japan), and the transport stream including an HDTV video stream and an MPEG AAC audio stream. The HDTV video stream is transcoded to an SDTV video stream, and this SDTV video stream and the original AAC audio stream are re-multiplexed to TS. It is necessary for both of the SDTV stream and the transport stream that is recorded to conform to the ISDB format.

As another method of recording the digital broadcast stream on the recording medium 100 is a method of recording the input transport stream in a transparent way (the input transport stream is recorded without any change) may be exemplified. In this case, when the syntax of the stream may be analyzed, the EP_map is created and recorded on the disc.

Alternatively, there is a case in which the input transport stream is recorded transparently (an input transport stream is recorded without any change), in which TU_map is created and recorded on the disc when the syntax of the stream may not be analyzed.

[Directory and File]

Figure 15:
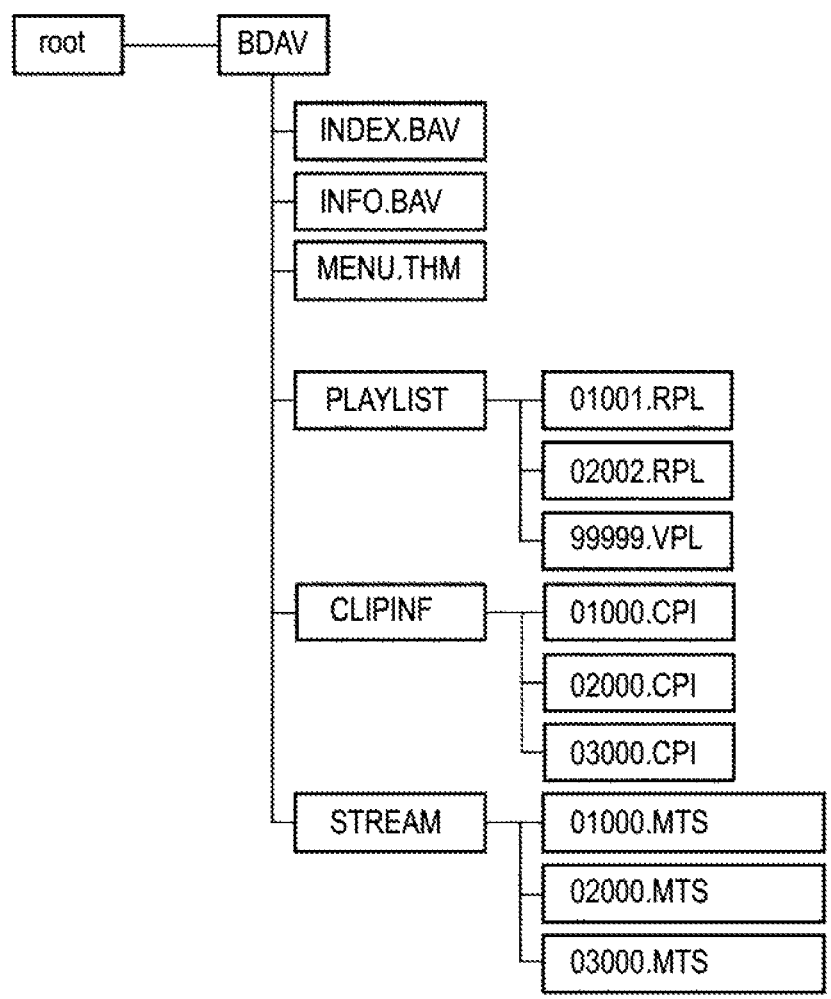
FIG. 15 is a diagram explaining a directory structure.

Next, a directory and a file will be described. Hereinafter, the recording and reproducing device 1 is appropriately described as a DVR (Digital Video Recording). FIG. 15 shows a diagram illustrating an example of a directory structure of the disc. Directories that are necessary for the disc of the DVR includes a root directory including "BDAV" directory, a "PLAYLIST" directory, "CLIPINF" directory, and "STREAM" directory, as shown in FIG. 15. Although directories other than these may be created below the root directory, it is assumed that these are disregarded in the application format of this embodiment.

All files and directories defined by the DVR application format are stored below the "BDAV" directory. The "BDAV" directory includes three directories. Database files of the Real PlayList and Virtual PlayList are placed below the "PLAYLIST" directory. This directory may exist in a state of being PlayList-free.

A database of the Clip is placed below "CLIPINF" directory. This directory may exist in a state of being Clip-free. The AV stream file is placed below the "STREAM" directory. This directory may exist in a state of being AV stream file-free.

The "BDAV" directory stores the following files. An "INDEX.BAV" file is an index file in which display information that is useful for display of a title list is extracted and collected in information of UIAppInfoPlayList( ) with respect to all of the PlayList files below the PLAYLIST directory. Here, additionally, private data of a maker for each PlayList file may be stored. The "INDEX.BAV" file is located below a BDAV directory that is the same parent directory as the PLAYLIST directory in which contents are recorded and is located in parallel with the PLAYLIST directory. That is, both of the PLAYLIST directory and the directory of the "INDEX.BAV" file are brother directories. Details of the "INDEX.BAV" file will be described later with reference to FIG. 17.

"INFO.BAV" file is created below the BDAV directory, and stores entire information of an application layer. One INFO.BAV is necessary to exist below the BDAV directory. A file name is fixed to the INFO.BAV. "MENU.THM" file stores information relating to a menu thumbnail image (thumbnail image of a list of contents). 0 or 1 menu thumbnail is necessary to exist below the BDAV directory. The file name is fixed to the MENU.THM. In a case where the menu thumbnail image does not exist, this file may not exist.

The "PLAYLIST" directory stores two kinds of PlayList files that are the Real PlayList and the Virtual PlayList. An "xxxxx.RPL" file stores information relating to one Real PlayList. One file is created for each Real PlayList. The file name is "xxxxx.RPL". Here, "xxxxx" denotes five numerical figures from 0 to 9. It is necessary for the file extension to be "RPL".

A "yyyyy.VPL" file stores information relating to one Virtual PlayList. One file is created for each Virtual PlayList. A file name is "yyyyy.VPL". Here, "yyyyy" denotes five numerical figures from 0 to 9 . It is necessary for a file extension to be "VPL".

A "CLIPINF" directory stores one file in correspondence with each AV stream file. A "zzzzz.CPI" file is a Clip Information file corresponding to one AV stream file (Clip AV stream file or Bridge-Clip AV stream file). A file name is "zzzzz.CPI". Here, "zzzzz" denotes five numerical figures from 0 to 9. It is necessary for the file extension to be "CPI".

A "STREAM" directory stores the AV stream file. A "zzzzz.MTS" file is an AV stream file that is treated by a DVR system. This file is a Clip AV stream file or Bridge-Clip AV stream. A file name is "zzzzz.MTS", and "zzzzz" denotes five numerical figures from 0 to 9. It is necessary for the file extension to be "MTS".

[INDEX.BAV File]

Next, the "INDEX.BAV" file in FIG. 15 will be described. In order for a user to select programs that are contents recorded on the recording medium 100, a title list of the programs (that is, a list of the PlayList) is created, and a displayable range is extracted from the title list and is output to the input and output of the user interface from the terminal 24 to be displayed for the user. Alternatively, the title list may be output to a display (not shown) from the terminal 32 to be displayed. As described later with reference to FIG. 17, display information of total programs, which is necessary for displaying the title list, is collectively stored in one "INDEX.BAV" file. As a result, the tile list may be quickly created and displayed.

FIG. 16 shows a diagram illustrating a display example of the title list. A design or display contents of the display screen depends on a maker of the recording and reproducing device 1. In this example, the following display information is displayed.

Title of Program: Moring news, news in the daytime, variety in the daytime, and evening news, Evening Popular Song Program Recorded Date and Time: January 1 (Monday) 7:00 AM, January 1 (Monday) 0:00 PM, January 1 (Monday) 1:00 PM, January 1 (Monday) 7:00 PM, January 1 (Monday) 9:00 PM Duration of Program: One and half hours, one hour, two hours Channel Number: 1 ch, 2 ch, 3 ch Channel Name: Japan broadcasting station, AAA broadcasting station Recording Mode: A direct recording mode, a standard recording mode, a long time recording mode It is necessary for the title list to display display information (that is, title) that is information ensuring a user can select a desired program. This display information may include, for example, the following information.

1. Title name (program) (PlayList_name)
2. Recorded Date and Time (time_zone, record_time_and_date)
3. Duration of Title (PlayList_duration)
4. Thumbnail Referring Information (ref_to_menu_thumbnail_index)
5. Mark Representing Whether or not It is a Newly Arrived Record (Not-Watched) (is_played_flag)
6. Channel Number (channel_number)
7. Channel Name (channel_name)

Among the seven pieces of display information, information that is necessary to be included in the title list includes three pieces of display information indicated by numbers 1 to 3. The display information of number 4 is also important for allowing a user to quickly understand the contents of the program.

The field names that are shown in parentheses after the seven pieces of display information are field names shown in UIAppInfoPlayList( ) (in FIG. 25 described later) except for ref_to_menu_thumbnail_index. Only the ref_to_menu_thumbnail_index is not included in the UIAppInfoPlayList( ). This is because a value of the ref_thumbnail_index (in FIG. 27 described later) is referred to when a value of mark_type of PlayListMark( ) (in FIG. 27 described later) in PlayList file (in FIG. 22 described later) is 0x01 or 0x02 (in FIG. 28 described later), and represents a representative image of the play list. That is, the value of the ref_thumbnail_index is set as the value of the ref_to_menu_thumbnail_index.

FIG. 17 shows a diagram illustrating the syntax of the INDEX.BAV. As shown in the same drawing, the "INDEX.BAV" file includes information described below.

Character letters of "INDX" enter a field of type_indicator. A version_number field denotes four character letters representing a version number of the "INDEX.BAV" file. A length field represents the number of bytes from immediately after the length field to the trailing end of the "INDEX.BAV" file. It is necessary for a numerical figure of number_of_PlayLists to be the same as the number of the PlayLists that are recorded in the PLAYLIST directory. A PlayList_file_name[k] field represents a file name of the PlayList. In addition, [k] is a variable that is incremented in a for-loop. An index_info_start_address[k] field represents an address of the leading byte of index_info[k] ( ) with the relative number of bytes from the leading byte of the INDEX.BAV file made as a unit. The relative number of bytes is counted from zero.

A ref_to_menu_thumbnail_index[k] field represents information of a thumbnail image representing the PlayList that is indicated by the PlayList_file_name[k]. In a case where the ref_to_menu_thumbnail_index[k] field has a value other than "0xFFFF", a thumbnail image representing the PlayList is added to the PlayList, and this thumbnail image is stored in the MENU.THM file. In a case where the ref_to_menu_thumbnail_index[k] field is 0xFFFF, a thumbnail image representing the PlayList is not added to the PlayList.

A PlayList_character_set[k] field represents a method of encoding the character letters that are encoded in channel_name[k] and PlayList_name[k] fields. A flag of is_played_flag[k] represents whether or not reproduction is performed. In a case where this flag is set to "1", the PlayList indicated by the PlayList_file_name[k] is reproduced at least once after being recorded. In a case where the flag is set to "0", the PlayList is never reproduced after being recorded.

In a case where a flag of is_virtual_PL[k] is set to "1", the PlayList indicated by the PlayList_file_name[k] indicates the Virtual PlayList.

In a case a flag of is_shared_Clip[k] is set to "1", the PlayList indicated by the PlayList_file_name[k] satisfies the following conditions.

(1) The PlayList is a Real PlayList.

(2) At least one among Clips that are referred to by the PlayItems of the Real PlayList is referred to by another Real PlayList.

The condition (2) may be substituted with the following condition (3) that is a broad condition compared to condition (2).

(3) In the PlayList indicated by the PlayList_file_name[k], a value of the is_shared_Clip has been set to "1" after being recorded (currently, the Clips that are referred to by the Real PlayList may not be referred to by another Real PlayList).

A time_zone[k] field represents a time zone (for example, Japan, United Kingdom, or the like) that is time information indicated by a record_time_and_date[k].

A record_time_and_date[k] field is a field of 56 bits that stores date and time when the PlayList indicated by the PlayList_file_name[k] is recorded. In this field, 14 numerical figures are encoded with four-bit Binary Coded Decimal (BCD) with respect to year/month/date/hour/minute/second. For example, 2001/12/23:01:02:03 is encoded to "0x20011223010203". A PlayList_duration[k] field is 24-bit field, which indicates a total reproduction time of the PlayList indicated by the PlayList_file_name[k] with an hour/minute/second unit. In this field, 6 numerical figures are encoded with four-bit Binary Coded Decimal (BCD). For example, 01:45:30 is encoded to "0x014530".

A channel_number[k] field represents a channel number or a service number of broadcasting that is selected by a user when the PlayList indicating the PlayList_file_name[k] is recorded. When a value of this field is 0xFFFF, this field is invalid. A channel_name_length[k] field represents the number of bytes of the length of the channel name indicated by the channel_name[k] field. A channel_name[k] field represents a channel name and a service name of broadcasting that is selected by a user when the PlayList indicated by the PlayList_file_name[k] is recorded.

A PlayList_name_length[k] field represents the number of bytes of the length of the PlayList name indicated by a PlayList_name[k] field. A PlayList_name[k] field represents a title (program) name of the PlayList indicated by the PlayList_file_name[k].

When a field value of a length_mpd[k] is not zero, mdp[k] ( ) exists, and this value represents the number of bytes of the mdp[k] ( ) A maker_ID[k] field represents a manufacturer of a recorder on which mdp[k]( ) is recorded. A value that is encoded in a maker_id may be allocated by a licenser of this format. A maker_model_code[k] field represents a model number of a recorder on which mdp[k]( ) is recorded. A value that is encoded to a maker_model_code[k] may be determined by a manufacturer obtaining a license of the format. A maker_private_data[k] field is a region in which maker private data is stored. Here, in addition to the above-described information that is standardized by the INDEX.BAV file, recording information that is unique to a maker may be stored. For example, information of a recording mode (information of standard recording mode and a long-time recording mode), a genre of a program, or the like may be recorded.

These length_mpd[k], maker_ID[k], maker_model_code[k], and maker_private_data[k] make up information that is unique to the maker.

X and Y are arbitrary positive integrals. A value of padding_word may be any value.

[INFO.BAV]

FIG. 18 is a diagram illustrating the syntax of the "INFO.BAV" file. The "INFO.BAV" file is made up by three objects, and these objects include UIAppInfoBDAV( ), TableOfPlayLists( ), and ExtensionData( ).

The Syntax of the INFO.BAV shown in FIG. 18 will be described.

Character letters of "INFO" enter a type_indicator field. A version_number field represents four character letters indicating a version number of the INFO.BAV file. A TableOfPlayLists_Start_address field represents an address of the leading byte of the TableOfPlayLists( ) with the relative number of bytes from the leading byte of the INFO.BAV file made as a unit. The relative number of bytes is counted from zero.

An ExtensionData_start_address field represents a leading address of the ExtensionData( ) with the relative number of bytes from the leading byte of the INFO.BAV file made as a unit. The relative number of bytes is counted from zero. A padding_word (padding word) is inserted according to the syntax of info.dvr. N1 and N2 are zero or arbitrary positive integers. Respective padding words may assume an arbitrary value.

A TableOfPlayLists( )field stores file names of the PlayLists (Real PlayList and Virtual PlayList). The TableOfPlayLists( )represents a default reproduction sequence of the PlayList.

An ExtensionData( ) field includes private data for a special application of each maker company, or an extended database defined by a BDAV standard. A recorder maker may insert private data of the maker in the Extension Data( ) for a special application of each company. The private data of each maker has standardized maker identifier for identifying the maker who has defined it. In addition, in the ExtensionData( ) of the INFO.BAV file, PL_to_Clips_table( ) described later as an extended database defined by a BDAV standard is recorded.

[ExtensionData( )]

FIG. 19 shows a diagram illustrating the syntax of the ExtensionData( ). Hereinafter, the syntax of the ExtensionData( ) shown in FIG. 19 will be described.

A length field represents the number of bytes from immediately after the length field to the trailing end of the ExtensionData( ). A data_block_start_address field represents an address of the leading byte of data_block( ) with the relative number of bytes from the leading byte of the ExtensionData( ) made as a unit. The relative number of bytes is counted from zero.

A number_of_ext_data_entries field represents the number of entries of ext_data_entry( ) that is included in the ExtensionData( ). ID1: a value of ID1 of 0x0000 to 0x00FF is used for identifying the extended database defined by the BDAV standard. When the value of the ID1 is out of a range of 0x0000 to 0x00FF, this represents a maker who manufactures the recorder in which the maker private data is created. The value of maker identification is designated by a licenser of the BDAV format. ID2: in a case where the value of the ID1 is 0x0000 to 0x00FF, the ID2 is used for identifying the extended database defined by the BDAV standard. When the value of the ID1 is out of a range of 0x0000 to 0x00FF, the ID2 represents a model number code of the recorder in which the maker private data is created. In this case, a value that is encoded in the ID2 may be determined by a manufacturer obtaining a license of the format. Values of ID1 and ID2 for identifying PL_to_Clip_table( ) are 0x00F0 and 0x0001, respectively.

An ext_data_start_address field represents an address of a byte at which extension data is initiated with the relative number of bytes from the leading byte of the Extension Data( ) made as a unit. The relative number of bytes is counted from zero. An ext_data_length field represents a magnitude of data with a byte unit of the extension data. A value of padding_word may be any value.

FIG. 20 shows a diagram illustrating an example of a syntax of the ExtensionData( ), and represents an image of the PL_to_Clips_table( ) that is recorded in the ExtensionData( ). As shown in the same drawing, the PL_to_Clips_table( ) is recorded in the ExtensionData( ).

The data_block_start_address represents an address of the leading byte of a data_block( ) in the ExtensionData( ). In this example, since only one PL_to_Clips_table( ) as the extension data is recorded in the ExtensionData( ), "1" is set to the number_of_ext_data_entries. The value of ID1 and ID2 for identifying the PL_to_Clips_table( ) are set to 0x00F0 and 0x0001, respectively.

An ext_data_start_address represents an address of the leading byte of the PL_to_Clips_table( ) in the ExtensionData( ) (in this example, this address is the same as the address of the leading byte of the data_block( ). ext_data_length represents the byte length of the PL_to_Clips_table( ). The PL_to_Clips_table( ) is recorded in the data_block( ).

[PL_to_Clips_table( )]

A syntax of the PL_to_Clips_table( ) that is recorded in the ExtensionData( ) of the INFO.BAV file is shown in FIG. 21. The PL_to_Clips_table( ) is a table in which Clip information file(s) that is referred to by an individual PlayList file is listed with respect to all PlayList files that are recorded below the PLAYLIST directory.

A length field represents the number of bytes from immediately after the length field to the trailing end of the PL_to_Clips_table( ). It is necessary for a numerical figure of number_of_PlayLists field to be the same as the number of the PlayLists that are recorded in the PLAYLIST directory. A PlayList_file_name[k] field represents a file name of the PlayList.

A Clips_table_start_address[k] field represents an address of the leading byte of the clips_table[k] ( ) with the relative number of byte from the leading byte of the PL_to_Clips_table( ) made as a unit. The relative number of the bytes is counted from zero. A number_of_PlayItems[k] field represents the number of PlayItems in a PlayList indicated by the PlayList_file_name[k].

A Clip_Information_file_name[k][i] field represents a file name of a Clip Information file that is referred to by the PlayItems in the PlayList indicated by the PlayList_file_name[k]. A value of padding_word may be any value.

[Real PlayList File and Virtual PlayList File]

Next, a description will be made with respect to the Real PlayList file and the Virtual PlayList file, that is, xxxxx.RPL and yyyyy.VPL of the "PLAYLIST" directory in FIG. 15. FIG. 22 shows a diagram illustrating the syntax of xxxxx.RPL (Real PlayList) or yyyyy.VPL (Virtual PlayList). The xxxxx.RPL and yyyyy.VPL have the same syntax structure. Each of the xxxxx.RPL and yyyyy.VPL is made up by three objects, and these objects includes PlayList( ), PlayListMark( ), and MakerPrivateData( ).

A PlayListMark_Start_address represents the leading address of the PlayListMark( ) with the relative number of bytes from the leading byte of the PlayList file made as a unit. The relative number of bytes is counted from zero.

A MakerPrivateData_Start_address represents the leading address of the MakerPrivateData( ) with the relative number of bytes from the leading byte of the PlayList file made as a unit. The relative number of bytes is counted from zero.

A padding_word (padding word) is inserted in accordance with the syntax of the PlayList file, and N1 and N2 are zero or arbitrary positive integers. Each padding word may assume an arbitrary value.

Here, PlayList will be further explained in the following although it has been explained briefly. It is necessary for a reproduction section in all Clips except the Bridge-Clip to be referred to by all Real PlayLists in the recording medium 100. Furthermore, it is necessary for two or more Real PlayLists not to overlap the reproduction section indicated by their PlayItems in the same Clip.

Figure 23A:
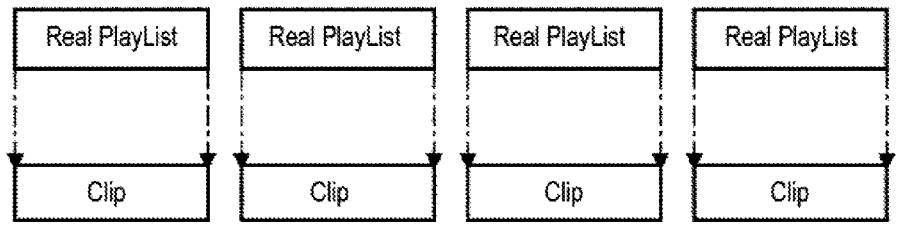
FIGS. 23A to 23C are diagrams explaining the PlayList.
Figure 23B:
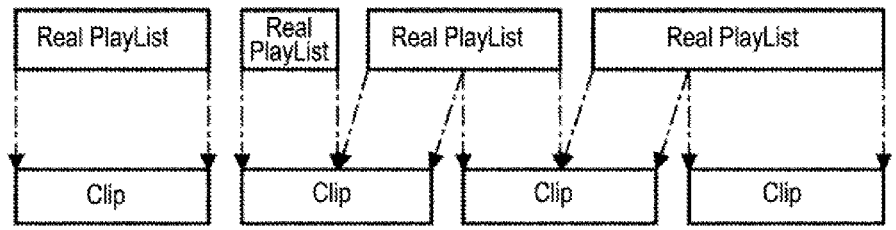
Figure 23C:
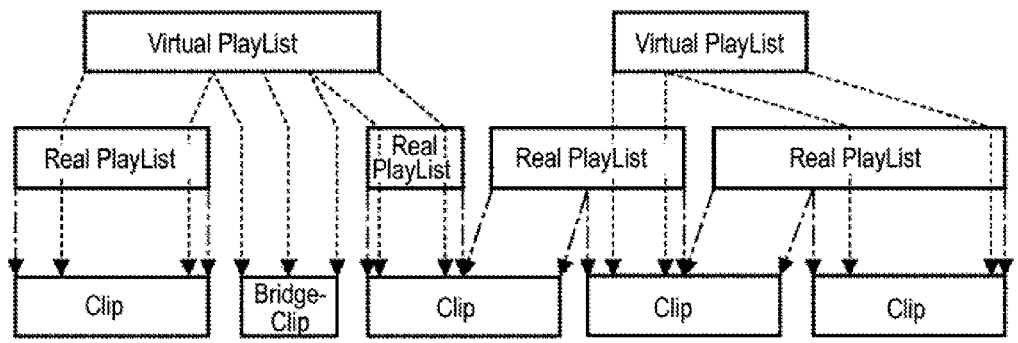

A description will be further made with reference to FIGS. 23A to 23C. For all Clips, corresponding Real PlayLists exist as shown in FIG. 23A. This rule is observed even after the editing operation is performed as shown in FIG. 23B. Therefore, all of the Clips may be viewed by referring to any one of Real PlayLists.

As shown in FIG. 23C, the reproduction section of the Virtual PlayList is necessary to be included in the reproduction section of the Real PlayList or in the reproduction section of the Bridge-Clip. It is necessary that a Bridge-Clip that is not referred to by any Virtual PlayList is not present on the disc.

The Real PlayList includes the list of the PlayItem, but it is necessary not to include a SubPlayItem. In a case where the Virtual PlayList includes the list of the PlayItem, the CPI_type shown in the PlayList( ) is the EP_map type, and the PlayList_type is 0 (PlayList including video and audio), the Virtual PlayList may include one SubPlayItem. In the PlayList( ) in this embodiment, the SubPlayItem is used only for audio post recording. It is necessary for the number of the SubPlayItem owned by one Virtual PlayList to be 0 or 1.

[Syntax of PlayList]

Next, the syntax of the PlayList will be described. FIG. 24 shows a diagram illustrating the syntax of the PlayList. In the description of the syntax of the PlayList shown in FIG. 24, a version_number represents four character letters representing a version number of the PlayList( ). It is necessary for the version_number to be encoded to "0045" according to ISO 646. A length is a 32-bit unsigned integer indicating the total number of bytes of the PlayList( ) from immediately after the length field to the trailing end of the PlayList( ). A PlayList_type is an 8-bit field representing the PlayList type.

The CPI_type is one-bit flag and represents the value of the CPI_type of the Clip that is referred to by the PlayItem( ) and the SubPlayItem( ). For all Clips that are referred to by one PlayList, it is necessary for values of the CPI_types defined in the CPI( ) to be the same as each other. A number_of_PlayItems is a 16-bit field representing the number of PlayItems present in the PlayList.

A PlayItem_id corresponding to a predetermined PlayItem( ) is defined by a sequence in which the PlayItem( ) appears in the for-loop including the PlayItem( ). The PlayItem_id begins with 0. A number_of_SubPlayItems is a 16-bit field representing the number of SubPlayItem in the PlayList. This value is 0 or 1. A path of an additional audio stream (audio stream path) is a kind of sub-path.

[UIAppInfoPlayList]

Next, UIAppInfoPlayList of the syntax of the PlayList shown in FIG. 24 will be described. The UIAppInfoPlayList stores parameters of the user interface application with respect to the PlayList. FIG. 25 shows a diagram illustrating the syntax of the UIAppInfoPlayList. Hereinafter, the syntax of UIAppInfoPlayList shown in FIG. 25 will be described.

A PlayList_character_set field represents a method of encoding character letters that are encoded in channel_name and PlayList_name fields. An is_played_flag field represents whether or not reproduction of the PlayList is performed. In a case where this flag is set to "1", the PlayList is reproduced at least one time after being recorded. In a case where the flag is set to "0", the PlayList is never reproduced after being recorded. A time_zone field represents a time zone of time information indicated by the record_time_and_date.

The record_time_and_date field is a field of 56 bits that stores date and time when the PlayList is recorded. In this field, 14 numerical figures are encoded with four-bit Binary Coded Decimal (BCD) with respect to year/month/date/hour/minute/second. For example, 2001/12/23:01:02:03 is encoded to "0x20011223010203". A PlayList_duration field is a field of 24 bits, which indicates a total reproduction time of the PlayList with an hour/minute/second unit. In this field, 6 numerical figures are encoded with four-bit Binary Coded Decimal (BCD). For example, 01:45:30 is encoded to "0x014530".

A channel_number field represents a channel number or a service number of broadcasting that is selected by a user when the PlayList is recorded. When a value of this field is 0xFFFF, this field is invalid. A channel_name_length field represents the number of bytes of the length of the channel name indicated by the channel_name field. A channel_name field represents a channel name and a service name of broadcasting that is selected by a user when the PlayList is recorded. A PlayList_name_length field represents the number of bytes of the length of the PlayList name. A PlayList_name field represents a title (program) name of the PlayList.

[Syntax of PlayItem]

FIG. 26 shows a diagram illustrating the syntax of the PlayItem. In the description of the syntax of the PlayItem shown in FIG. 26, a Clip_information_file_name field represents a file name of the Clip Information file. It is necessary for a Clip_stream_type that is defined in ClipInfo( ) of the Clip Information File to represent the Clip AV stream.

STC_sequence_id is 8-bit field and represents STC_sequence_id of a STC continuous section that is referred to by the PlayItem. When the CPI_type designated in the PlayList( ) is a TU_map type, this 8-bit field has no meaning and is set to 0. IN_time is a 32-bit field and stores reproduction starting time of the PlayItem. The semantics of IN_time is different in accordance with CPI_type defined in the PlayList( ).

OUT_time is a 32-bit field and stores reproduction termination time of the PlayItem. The semantics of OUT_time is different in accordance with CPI_type defined in the PlayList( ).

Connection condition is a 2-bit field representing the connection state between a preceding PlayItem and a current PlayItem.

[PlayListMark( )]

Next, a description will be made with respect to the PlayListMark( ) in the syntax of the xxxxx.RPL and yyyyy.VPL shown in FIG. 22. Mark information with respect to PlayList is stored in this PlayListMark. FIG. 27 shows a diagram illustrating the syntax of the PlayListMark. In the description of the syntax of the PlayListMark shown in FIG. 27, version_number is four character letters indicating a version number of the PlayListMark( ). It is necessary for the version_number to be encoded to "0045" according to ISO 646.

A length is a 32-bit unsigned integer representing the total number of byte of the PlayListMark( ) from immediately after the length field to the trailing end of the PlayList Mark( ). A number_of_PlayList_marks is a 16-bit unsigned integer representing the number of marks that are stored in the PlayListMark. The number_of_PlayList_marks may be 0. A mark_type is 8-bit field representing a mark type.

A 32-bit field of a mark_time_stamp stores a time stamp representing a point designated by the mark. The semantics of the mark_time_stamp is different in accordance with CPI_type defined in the PlayList( ). A PlayItem_id is an 8-bit field designating the PlayItem where the mark is put. A value of PlayItem_id corresponding to a predetermined PlayItem is defined in the PlayList( ) (refer to FIG. 24).

An 8-bit field of a character set illustrates a method of encoding character letters encoded in the mark_name field. The 8-bit field of name_length represents the byte length of the mark name shown in the mark_name field. The mark_name field represents the mark_name. The number of bytes corresponding to the number of name_lengths from left of this field is effective character letters and represents the mark name. In the mark_name field, the value next following these effective character letters may be set to an arbitrary value.

A ref_thumbnail_index field represents information of the thumbnail image added to the mark. When a value of the field of the ref_thumbnail_index is not 0xFFFF, a thumbnail image is added to the mark, and the thumbnail image is stored in the MENU. THM file. This image is referred to in the MENU. THM file using the value of ref_thumbnail_index. When the ref_thumbnail_index field is 0xFFFF, this represents that no thumbnail image is added to the mark.

FIG. 28 shows a diagram illustrating a table of a mark_type. As shown in the same drawing, a mark type is defined by a value of the mark_type. In a case where the value of mark_type is 0x01, the mark is a representative image of the play list, and this image is selected from a video picture that is referred to by the PlayList.

In this case, the mark_time_stamp (FIG. 27) represents a Presentation time stamp of a picture in the video that is referred to by the PlayList. When the value of the ref_thumbnail_index (FIG. 27) is other than xFFFF, the thumbnail image is stored in the MENU.THM of FIG. 29 to be described later. When the value of the ref_thumbnail_index is xFFFF, the thumbnail image is not stored in the MENU.THM of FIG. 29. In this case, a player may decode a picture that is designated by the Presentation time stamp in the video that is referred to by the PlayList. The number of the mark type value 0x01 or 0x02 of PlayListMark( ) is 0 or 1.

In a case where the value of mark_type is 0x02, the mark is a representative image of the play list, and this image is not selected from a video picture that is referred to by the PlayList.

In this case, it is necessary for the value of the ref_thumbnail_index to be other than 0xFFFF. The thumbnail image is stored in the MENU.THM of FIG. 29. Zero is set to the mark_time_stamp and the PlayItem_id. The number of the mark type value 0x01 or 0x02 of PlayListMark( ) is 0 or 1.

In a case where the value of mark_type is 0x03, the mark is a Resume-mark. This is a reproduction resume point. It is necessary for the number of the reproduction resume points that are defined in the PlayListMark( ) to be 0 or 1.

In a case where the value of mark_type is 0x04, the mark is a reproduction entry point of the PlayList. This mark may be set by a user, and is used, for example, as a mark that designates a starting point of a preferable scene.

In a case where the value of mark_type is 0x06, the mark is a skip mark point. The player skips the program from this point to the end of the program. It is necessary for the number of the skip mark points that are defined in the PlayListMark( ) to be 0 or 1.

[MENU. THM]

FIG. 29 shows a diagram illustrating the syntax of the MENU.THM (or MARK.THM) of FIG. 15, in which the MENU.THM file includes Thumbnail( ).

FIG. 30 shows a diagram illustrating the syntax of the Thumbnail( )in the syntax of the MENU.THM (or MARK.THM) shown in FIG. 29. In the description of the syntax of the Thumbnail( ) shown in FIG. 29, a version_number represents four character letters representing a version number of the Thumbnail( ). It is necessary for the version_number to be encoded to "0045" according to ISO 646.

A length is a 32-bit unsigned integer representing the total number of bytes of the Thumbnail( ) from immediately after the length field to the trailing end of the Thumbnail( ). A tn_blocks_start_address is 32-bit unsigned integer representing an address the leading byte of the first tn_block with a relative number of bytes from the leading byte of the Thumbnail( ) made as a unit. The relative number of bytes is counted from zero. A number_of_thumbnails is 16-bit unsigned integer affording the number of entries of the thumbnail image that is included in the Thumbnail( ).

A tn_block_size is 16-bit unsigned integer affording the magnitude of one tn_block with 1024 bytes made as a unit. For example, when the tn_block_size is 1, this represents that the magnitude of one tn_block is 1024 bytes. A number_of_tn_blocks is 16-bit unsigned integer representing the number of entries of the tn_block in the Thumbnail( ). A thumbnail_index is a 16-bit unsigned integer representing the index number of a thumbnail image represented by the thumbnail information corresponding to one for-loop beginning from this thumbnail_index field. It is necessary not to use a value of 0xFFFF as thumbnail_index. The thumbnail_index is referred to by a ref_thumbnail_index in the UIAppInfoVolume( ), UIAppInfoPlayList( ), PlayListMark( ), and ClipMark( ).

A thumbnail_picture_format is an 8-bit unsigned integer representing the picture format of a thumbnail image.

A picture_data_size is a 32-bit unsigned integer indicating the byte length of a thumbnail image in terms of a byte as a unit. A start_tn_block_number is a 16-bit unsigned integer indicating the tn_block number of the tn_block where the thumbnail image data begins. It is necessary for the leading end of the thumbnail image data to be coincident with the leading end of tn_block. The tn_block number begins with 0, and is associated with the value of a variable k in the for-loop in tn_block.

An x_picture_length is a 16-bit unsigned integer representing the number of pixels in the horizontal direction of a frame image of the thumbnail image. An y_picture_length is a 16-bit unsigned integer representing the number of pixels in the vertical direction of a frame image of the thumbnail image. A tn_block is an area in which a thumbnail image is stored. The entirety of tn_blocks in Thumbnail( ) have the same size (fixed length) as each other and the magnitude thereof is defined by tn_block_size.

[AV Stream File]

Next, an AV stream file will be described. The AV stream file is stored in the "MTS" file of the "STREAM" directory (FIG. 15). There are two types of AV stream files. One is a Clip AV stream and the other is a Bridge-Clip AV stream file. It is necessary for both AV streams to have a DVR MPEG-2 transport stream file structure.

[Recording Process 1]

Figure 31:
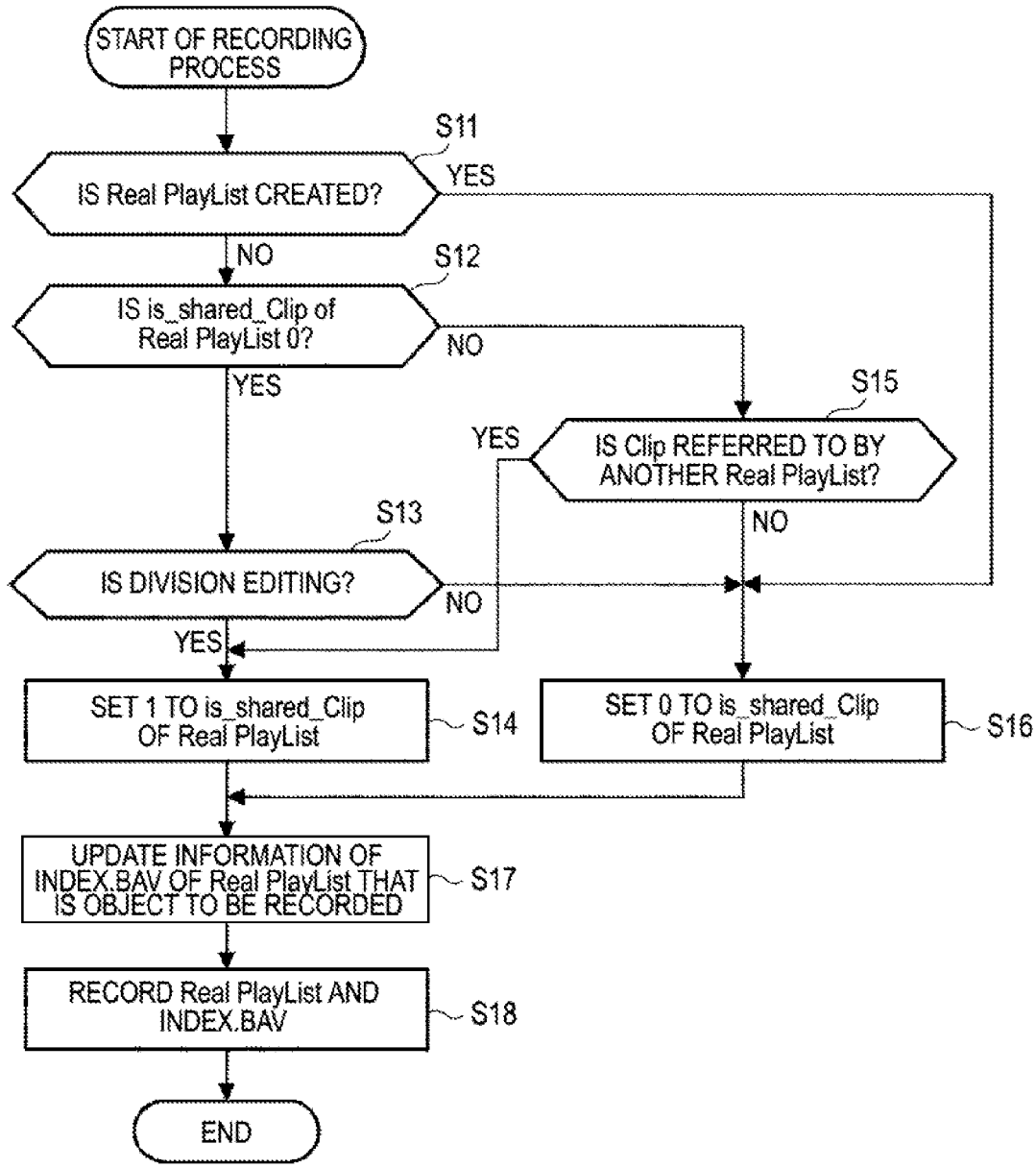
FIG. 31 is a flowchart explaining a recording process.
Figure 32:
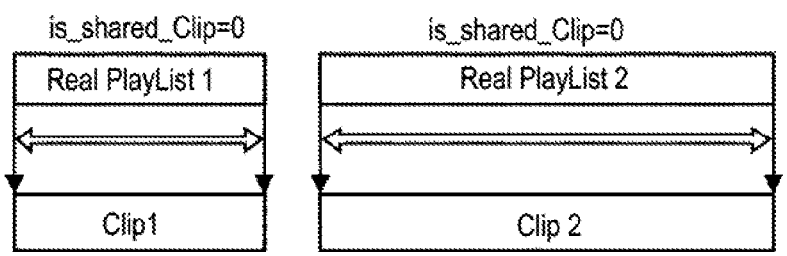
FIG. 32 is a diagram illustrating creation of the Real PlayList.
Figure 33:
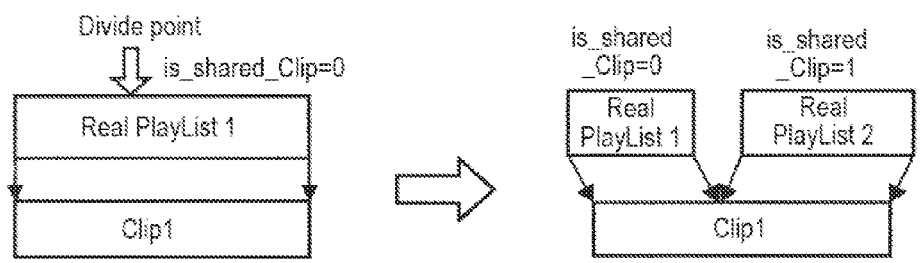
FIG. 33 is a diagram illustrating division of the Real PlayList.
Figure 34:
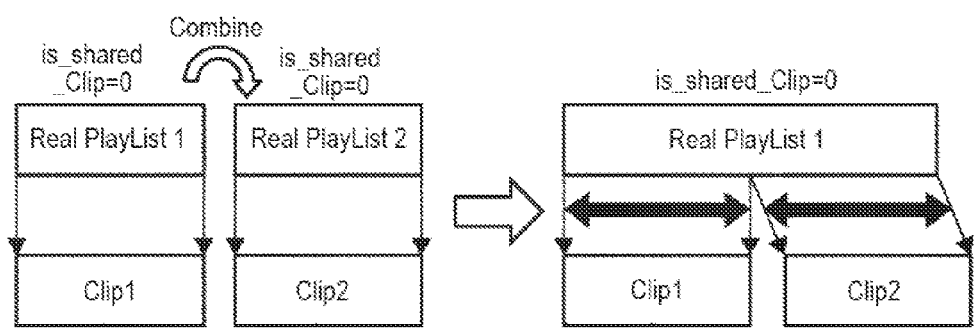
FIG. 34 is a diagram illustrating combination of the Real PlayList.

Next, a process of recording the is_shared_Clip on the recording medium 100 will be described with reference to FIGS. 31 to 34. FIG. 31 shows a flowchart explaining the recording process. FIGS. 32 to 34 show diagrams of creation of the Real PlayList, division of the Real PlayList, and combination of the Real PlayList, respectively. This process is carried out accompanying recording of a program as contents on the recording medium 100 or editing of the program on the basis of user's instruction.

In step S11, the determination unit 204 determines whether or not the Real PlayList is created. For example, in the case of recording new contents, the Real PlayList is created.

In a case where the Real PlayList is created, in step S16, the setting unit 203 sets 0 to the is_shared_Clip of the Real PlayList. For example, in the case of recording new contents, 0 is set to the is_shared_Clip of the Real PlayList.

For example, as shown in FIG. 32, in a case where corresponding Real PlayList 1 and Real PlayList 2 are created to record a Clip 1 and a Clip 2 on the recording medium 100, 0 is set to respective is_shared_Clips.

In a case where the Real PlayList is not created, instep S12, the determination unit 204 determines whether or not the is_shared_Clip of the Real PlayList is 0. For example, in the case of editing the recorded contents, the recorded Real PlayList is edited. In this case, the recorded Real PlayList, that is, a value of the is_shared_Clip of the Real PlayList that is an object to be edited is determined.

In a case where the is_shared_Clip of the Real PlayList that is an object to be edited is 0, in step S13, the determination unit 204 determines whether or not the current editing is division editing. In a case where the current editing is the division editing, in step S14, the setting unit 203 sets 1 to the is_shared_Clip of the Real PlayList.

For example, as shown in FIG. 33, in a case where the Real PlayList 1 corresponding to the Clip 1 is divided into the Real PlayList 1 and the Real PlayList 2 at a predetermined division point, 1 is set to each of the is_shared_Clip of the Real PlayList 1 and the Real PlayList 2 after the editing. In addition, through this operation, any variation does not occur in the Clip.

Conversely, in a case where the current editing is not the division editing, in step S16, the setting unit 203 set 0 to the is_shared_Clip of the Real PlayList.

For example, as shown in FIG. 34, in a case where the Real PlayList 1 and the Real PlayList 2, which correspond to the Clip 1 and the Clip 2, respectively, are combined, 0 is set to the is_shared_Clip of the Real PlayList 1 after the editing. In addition, through this operation, no variation occurs in the Clips.

On the other hand, in step S12, when it is determined that the is_shared_Clip of the Real PlayList that is an object to be edited is not 0, that is, 1, a determination process of step S15 is performed. In step S15, the determination unit 204 determines whether or not the Clip is referred to by another Real PlayList. Specifically, the determination unit 204 determines whether or not the Clip that is referred to by the Real PlayList after the editing is referred to by another Real PlayList in which the is_shared_Clip is 1.

In a case where the Clip that is referred to by the Real PlayList after the editing is referred to by another Real PlayList in which the is_shared_Clip is 1, a process of step S14 is performed. That is, 1 is set to the is_shared_Clip of the Real PlayList after the editing. In a case where the Clip that is referred to by the Real PlayList after the editing is not referred to by another Real PlayList in which the is_shared_Clip is 1, a process of step S16 is performed. That is, 0 is set to the is_shared_Clip of the Real PlayList after the editing.

After the processes of steps S14 and S16, in step S17, the updating unit 206 updates information of the INDEX.BAV of the Real PlayList that is an object to be recorded. That is, as described with reference to FIG. 17, the is_shared_Clip is included in the INDEX.BAV of FIG. 17. Therefore, the is_shared_Clip of the INDEX.BAV is updated to the value set by the processes in steps S14 and S16. Absolutely, in addition to this updating, changed information is also updated.

In step S18, the recording unit 201 records the Real PlayList and the INDEX.BAV. That is, in step S17, the INDEX.BAV in which the is_shared_Clip and various pieces of information are updated is recorded on the recording medium 100.

In the recording process of FIG. 31, a condition which the PlayList satisfies in a case where the flag of the is_shared_Clip is set to "1" is the above-described (2). That is, the Real PlayList in which the is_shared_Clip is 1 is a PlayList in which at least one among Clips that are referred to by the PlayItems is referred to by another Real PlayList.

A recording process in a case where the meaning of the is_shared_Clip is defined as the above-described (3) will be described later with reference to FIG. 43, but in the recording process of FIG. 31, the PlayList in which the is_shared_Clip is 1 may be smaller than that in the process in FIG. 43. As a result, in the recording process of FIG. 31, a time taken to read out all PlayLists in which the is_shared_Clip is 1 may be shorter than that in the recording process of FIG. 43 in which the meaning of the is_shared_Clip is defined as the above-described (3).

[Contents Deletion Process]

Figure 35:
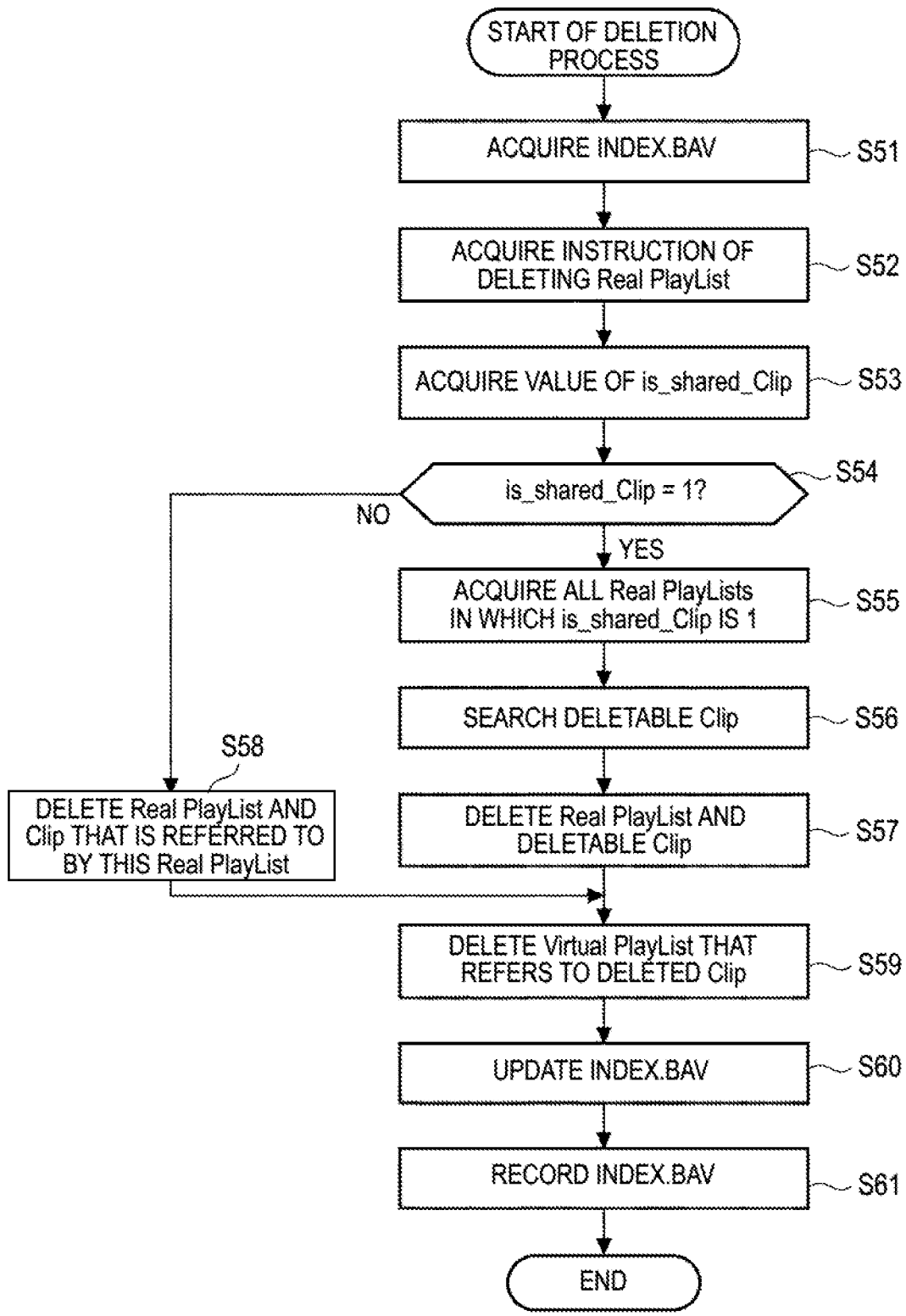
FIG. 35 is a flowchart explaining a deletion process.
Figure 36:
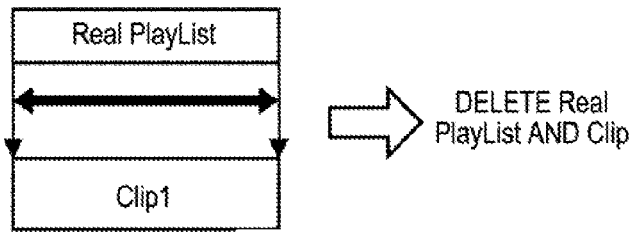
FIG. 36 is a diagram illustrating deletion of the entirety of the Real PlayList.
Figure 37:
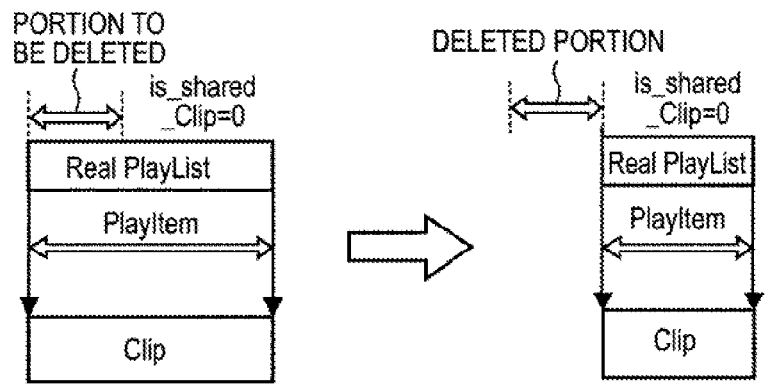
FIG. 37 is a diagram illustrating deletion of a part of the Real PlayList.

Next, the contents deletion process will be described with reference to FIGS. 35 to 37. FIG. 35 shows a flowchart explaining the deletion process. FIG. 36 shows a diagram illustrating deletion of the entirety of the Real PlayList, and FIG. 37 shows a diagram illustrating deletion of a part of the Real Playlist.

In step S51, the acquisition unit 202 acquires the INDEX.BAV. That is, the INDEX.BAV file (FIG. 17) that is recorded on the recording medium 100 in step S18 of FIG. 31 is read out.

In step S52, the acquisition unit 202 acquires an instruction of deleting the Real PlayList. That is, when a user gives an instruction of deleting the contents, a list of the contents (FIG. 16) is also displayed. The user designates the content (PlayList) that is an object to be deleted in the list. This designated Real PlayList is acquired.

In step S53, the acquisition unit 202 acquires a value of the is_shared_Clip. That is, in the is_shared_Clip that is included in the INDEX.BAV that was read out in step S51, a value of the is_shared_Clip of the Real PlayList that is an object to be deleted is acquired.

In step S54, the determination unit 204 determines whether or not the value of the is_shared_Clip of the Real PlayList that is an object to be deleted, which was acquired in step S53, is 1.

In a case where the is_shared_Clip of the Real PlayList that is an object to be deleted is not 1, that is, in the case of 0, in step S58, the deletion unit 205 deletes the Real PlayList and a Clip that is referred to by the Real PlayList. That is, in this case, since the Clip, which is referred to by the Real PlayList that is an object to be deleted, is not referred to by another Real PlayList, the Real PlayList that is an object to be deleted and the Clip that is referred to by this Real PlayList are deleted.

For example, as shown in FIG. 36, in a case where the Real PlayList refers to the Clip, when deletion of the entirety of the Real PlayList is instructed, the Real PlayList and the Clip that is referred to by this Real PlayList are deleted.

In addition, for example, as shown in FIG. 37, in a case where the Real PlayList refers to the Clip, when deletion of a part of the Real PlayList is instructed, a part of the Real PlayList, which is instructed to be deleted, is deleted. In addition, a part of the Clip, which is referred to by a part that is instructed to be deleted, is deleted. When the editing of partial deletion of the Real PlayList in which the value of the is_shared_Clip is 0 is carried out, the value of the is_shared_Clip of the Real PlayList after the editing is also regarded as 0 (the above-described processes instep S12, S13, and S16 of FIG. 31).

In practical use, the number of the Real PlayLists in which the is_shared_Clip is 0 is overwhelmingly larger than that of the Real PlayLists in which the is_shared_Clip is 1. That is, the Real PlayList in which the Clip referred to by the Real PlayList itself is not referred to by another Real PlayList is more numerous than the Real PlayList in which the Clip referred to by the Real PlayList itself is referred to by another Real PlayList. Therefore, when the Real PlayList in which the is_shared_Clip is 0 is immediately deleted, an average processing time of the deletion process may be shortened.

Conversely, in a case where in step S54, it is determined that the is_shared_Clip of the Real PlayList that is an object to be deleted is 1, at least one Clip that is referred to by the Real PlayList that is an object to be deleted is referred to by another Real PlayList. Therefore, in step S55, the acquisition unit 202 acquires all Real PlayLists in which the is_shared_Clip is 1. That is, all of the Real PlayLists in which the is_shared_Clip is 1 are read out from the INDEX.BAV of FIG. 17.

Instep S56, the search unit 207 searches for a deletable Clip. That is, the deletable Clip is searched for in the Real PlayLists in which the is_shared_Clip is 1, which is acquired in step S55. Here, the deletable Clip is a Clip, which is not referred to by another Real PlayList in which the is_shared_Clip is 1, among Clips that are referred to by the Real PlayList that is an object to be deleted.

The Real PlayList that is regarded as an object to be searched is limited to the Real PlayList in which the is_shared_Clip is 1 in a process in step S55. Therefore, the search and the deletion may be quickly carried out compared to a case in which the flag of the is_shared_Clip is not present.

In step S57, the deletion unit 205 deletes the Real PlayList and the deletable Clip. That is, the Real PlayList that is an object to be deleted and the deletable Clip that is searched in step S56 are deleted.

After the processes in steps S57 and S58, in step S59, the deletion unit 205 deletes a Virtual PlayList that refers to the deleted Clip. That is, the Virtual PlayList that is referred to by the deleted Clip has no meaning to exist. In addition, the Virtual PlayList does not share the Clip with another Virtual PlayList. Therefore, in a case where the Virtual PlayList exists, this Virtual PlayList is deleted immediately.

In step S60, the updating unit 206 updates the INDEX.BAV. That is, the INDEX.BAV is updated so as to correspond to the deletion process instep S57 to S59. In addition, information of the is_shared_Clip or the like, which accompanies the deletion process, is updated in the above-described process in step S17 of FIG. 31.

Next, in step S61, the recording unit 201 records the INDEX.BAV. That is, the INDEX.BAV file that is updated in step S60 is recorded on the recording medium 100.

[Editing Example 1]

Next, editing of the Real PlayList will be described with reference to FIGS. 38 to 42. FIGS. 38 to 42 show diagrams illustrating the editing of the Real PlayList.

Figure 38:
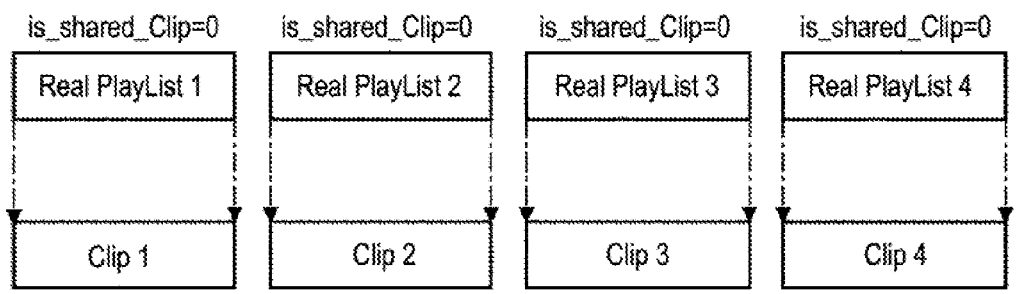
FIG. 38 is a diagram illustrating editing of the Real PlayList.

FIG. 38 shows an example when the Real PlayList 1 to the Real PlayList 4, which correspond to the plurality of Clip 1 to Clip 4, are created through the creation operation. Similarly to the case shown in FIG. 32, the value of the is_shared_Clip in all of the Real PlayList 1 to Real PlayList 4 is 0.

Figure 39:
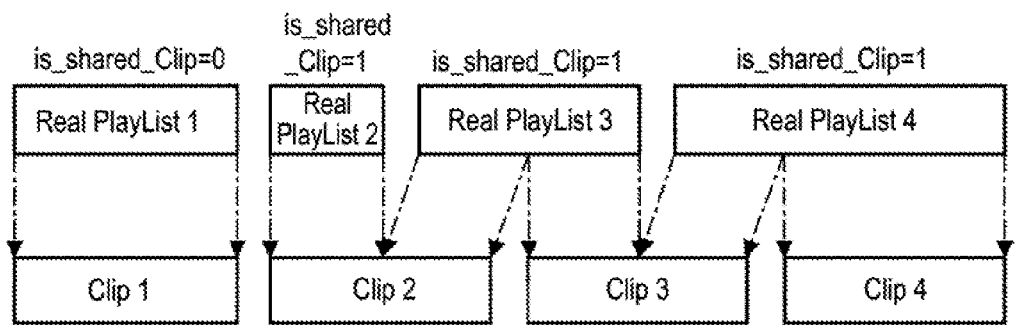
FIG. 39 is a diagram illustrating editing of the Real PlayList.

FIG. 39 shows an example of the Real PlayList on the recording medium 100 after editing plural times. In this example, the value of the is_shared_Clip of the Real PlayList 1 is 0, and the value of the is_shared_Clip of the Real PlayList 2 to the Real PlayList 4 is 1. The Real PlayList 1 is referring to the Clip 1. The Real PlayList 2 is referring to a part of the Clip 2. The Real PlayList 3 is referring to a portion of the Clip 2, which is not referred to by the Real PlayList 2, and a part of the Clip 3. The Real PlayList 4 is referring to a portion of the Clip 3, which is not referred to by the Real PlayList 3, and the Clip 4.

Figure 40:
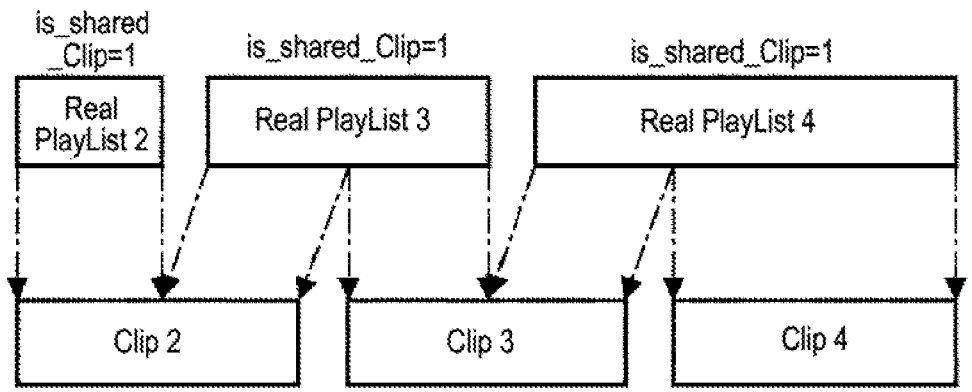
FIG. 40 is a diagram illustrating editing of the Real PlayList.

FIG. 40 illustrates the Real PlayList on the recording medium 100 after the Real PlayList 1 of FIG. 39 is deleted. Since the is_shared_Clip of the Real PlayList 1 is 0, the Real PlayList 1 and the Clip 1 (a Clip information file and a corresponding Clip AV stream file) that is referred to by the Real PlayList 1 itself may be deleted (the above-described process in step S58 of FIG. 35).

Figure 41:
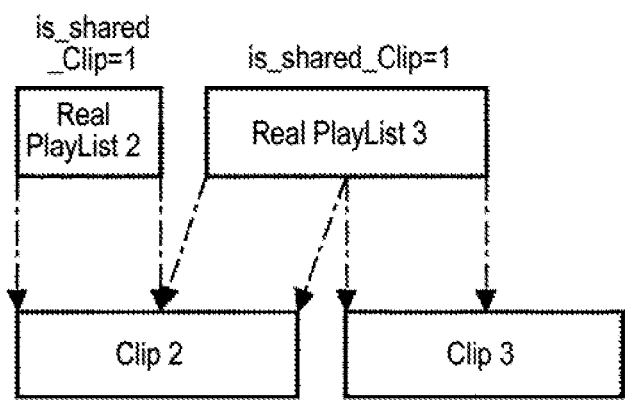
FIG. 41 is a diagram illustrating editing of the Real PlayList.

FIG. 41 illustrates the Real PlayList on the recording medium 100 after the Real PlayList 4 is deleted from the state of FIG. 40. Since the is_shared_Clip of the Real PlayList 4 in FIG. 40 is 1, all PlayList files, in which the is_shared_Clip is 1, in the INDEX.BAV are read out from the recording medium 100 (the above-described process in step S55 of FIG. 35). In addition, it is examined whether or not the Clip 4, which is referred to by the Real PlayList 4 that is an object to be deleted, is referred to by another Real PlayList in which the is_shared_Clip is 1 (the above-described process in step S56 of FIG. 35).

Since the Clip 3 that is referred to by the Real PlayList 4 is referred to by another Real PlayList 3 in which the is_shared_Clip is 1, this Clip 3 is not a deletable Clip. Since the Clip 4 that is referred to by the Real PlayList 4 is not referred to by another Real PlayList in which the is_shared_Clip is 1, this Clip 4 is a deletable Clip. Therefore, the Real PlayList 4 and the Clip 4 are deleted, such that it enters a state shown in FIG. 41 (the above-described process in step S57 of FIG. 35).

Figure 42:
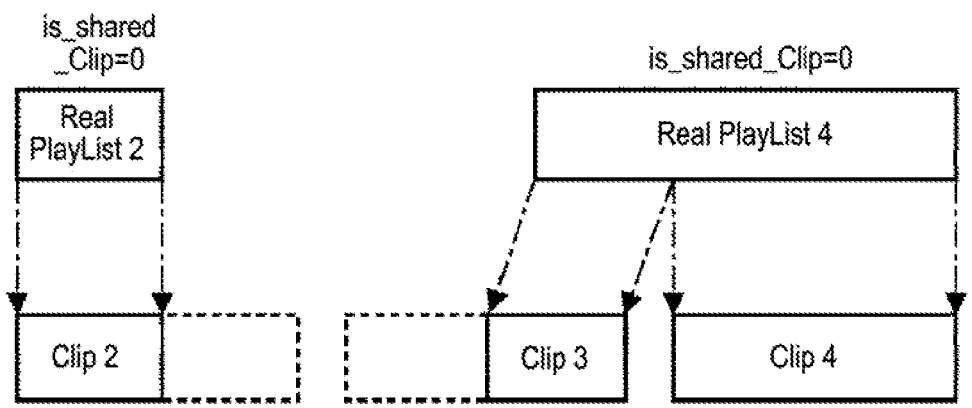
FIG. 42 is a diagram illustrating editing of the Real PlayList.

FIG. 42 illustrates the Real PlayList after the recording process of FIG. 31 and the deletion process of FIG. 35 are performed, and then the Real PlayList 3 is deleted from the state of FIG. 40. Since the is_shared_Clip of the Real PlayList 3 of FIG. 40 is 1, all PlayLists, in which the is_shared_Clip is 1, in the INDEX.BAV are read out from the recording medium 100 (the above-described process in step S55 of FIG. 35). In addition, it is examined whether or not the Clip, which is referred to by the Real PlayList 3 that is an object to be deleted, is referred to by another Real PlayList in which the is_shared_Clip is 1 (the above-described process in step S56 of FIG. 35).

Since the Clip 2 and Clip 3 that are referred to by the Real PlayList 3 are referred to by other Real PlayList 1 and Real PlayList 4 in which the is_shared_Clip is 1, these Clip 2 and Clip 3 are not deletable Clips. Therefore, only the Real PlayList 3 is deleted, and thus it enters a state shown in FIG. 42 (the above-described process in step S57 of FIG. 35).

In addition, in the example of FIG. 42, unnecessary stream portions of the Clip 2 and the Clip 3 are deleted together with the deletion of the Real PlayList 3. This process is a process corresponding to the example of partially deleting the Real PlayList of FIG. 37.

As shown in FIG. 42, as a result of the editing, the Clip 2 that is referred to by the Real PlayList 2, and the Clips 3 and 4 that are referred to by the Real PlayList 4 are not referred to by another Real PlayList. Therefore, the is_shared_Clip of each of the Real PlayList 2 and the Real PlayList 4 is changed to 0 (the above-described processes in steps S12, S15, and S16 of FIG. 31).

[Recording Process 2]

Next, a description will be made with respect to a process of recording an is_shared_Clip flag in a case where a condition which the PlayList satisfies when the is_shared_Clip flag is set to "1" is set to the above-described (3) with reference to FIG. 43. In this case, the Real PlayList in which the is_shared_Clip is 1 is a Real PlayList in which the value of the is_shared_Clip has been set to "1" once after being recorded. That is, this Real PlayList is a Real PlayList in which the Clips that are referred to by the Real PlayList may not be currently referred to by another Real PlayList.

In step S111, the determination unit 204 determines whether or not the Real PlayList is created. For example, in a case where new contents are recorded, the Real PlayList is created.

In a case where the Real PlayList is created, in step S115, the setting unit 203 sets 0 to the is_shared_Clip of the Real PlayList. For example, in the case of recording new contents, 0 is set to the is_shared_Clip of the Real PlayList.

In a case where the Real PlayList is not created, in step S112, the determination unit 204 determines whether or not the is_shared_Clip of the Real PlayList is 0. For example, in the case of editing the recorded contents, the recorded Real PlayList is edited. In this case, the determination is made with respect to the recorded Real PlayList, that is, the value of the is_shared_Clip of the Real PlayList that is an object to be edited.

In a case where the is_shared_Clip of the Real PlayList that is an object to be edited is 0, in step S113, the determination unit 204 determines whether or not the current editing is division editing. In a case where the current editing is division editing, in step S114, the setting unit 203 sets 1 to the is_shared_Clip of the Real PlayList.

Conversely, in a case where the current editing is not division editing, in step S115, the setting unit 203 sets 0 to the is_shared_Clip of the Real PlayList.

In addition, in a case where in step S112, it is determined that the is_shared_Clip of the Real PlayList is not 0, that is, in the case of being determined as 1, the determination process in step S113 is skipped, and the process proceeds to step S114, and 1 is set to the is_shared_Clip of the Real PlayList. That is, when the is_shared_Clip is once set to 1, the is_shared_Clip is not changed to 0 ever since.

After the processes in steps S114 and S115, in step S116, the updating unit 206 updates the information of the INDEX.BAV of the Real PlayList that is an object to be recorded.

In step S117, the recording unit 201 records the Real PlayList and the INDEX.BAV. That is, in step S116, the INDEX.BAV in which the is_shared_Clip and various pieces of information are updated is recorded on the recording medium 100.

Figure 43:
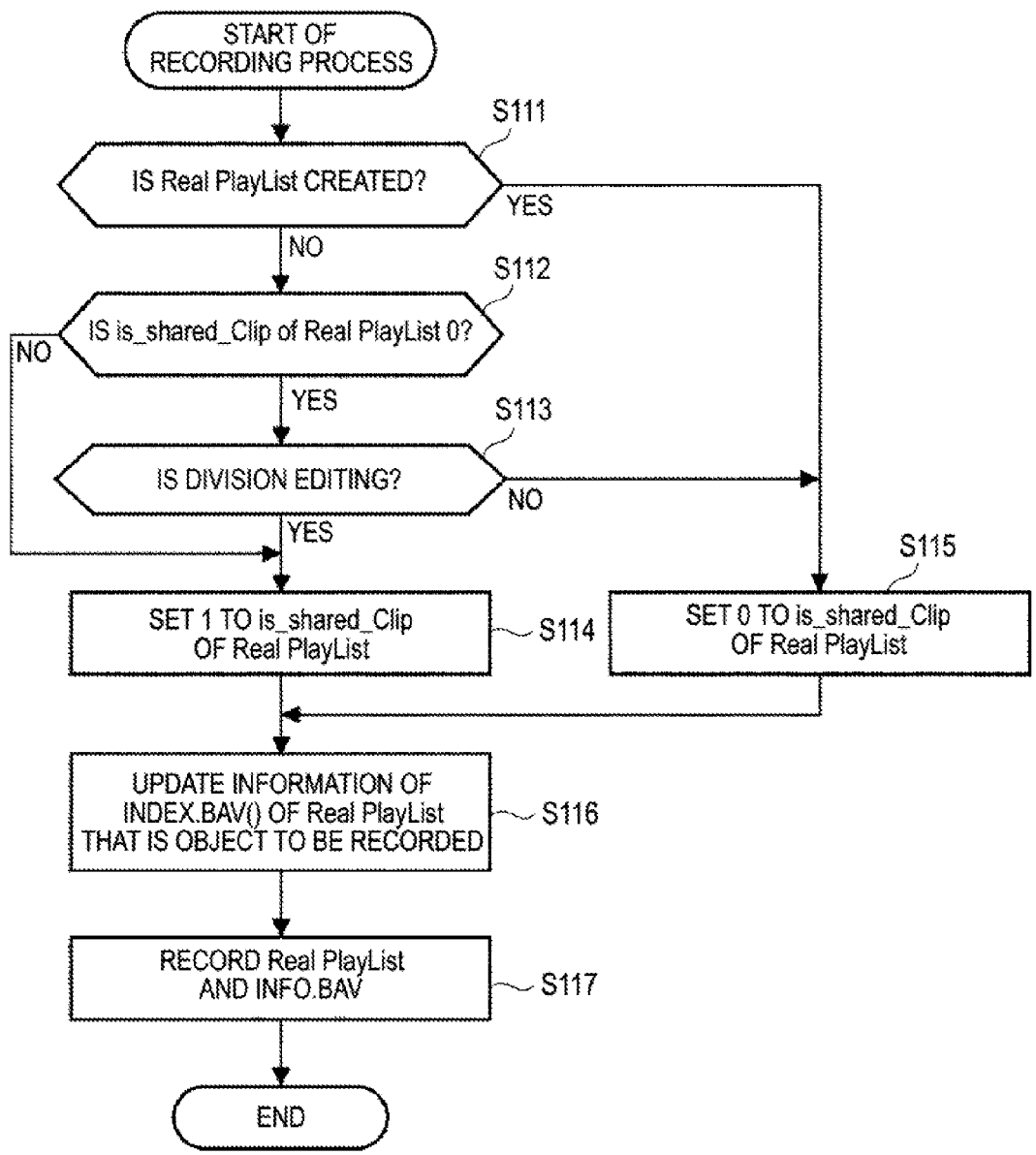
FIG. 43 is a flowchart explaining a recording process.

In this manner, in the recording process of FIG. 43, the process of step S15 in the recording process of FIG. 31 is omitted. Other processes of the recording process of FIG. 43 are the same as the case of FIG. 31.

That is, the processes in steps S111 to S117 of FIG. 43 correspond to the processes in steps S11 to S14, and S16 to S18 of FIG. 31, respectively.

[Editing Example 2]

In the recording process of FIG. 31, as described above with reference to FIGS. 40 and 42, the is_shared_Clip may be changed. That is, when the Real PlayList 3 is deleted in a state shown in FIG. 40, as shown in FIG. 42, the Clips that are referred to by the Real PlayList 2 and the Real PlayList 4 are not referred to by another Real PlayList. Therefore, the is_shared_Clip of the Real PlayList 2 and the Real PlayList 4 may be changed from 1 to 0.

However, in the recording process in FIG. 43, the value of the is_shared_Clip of the Real PlayList 2 and the Real PlayList 4 after the editing is not changed, and the value thereof is left to 1 (the above-described processes in steps S112 and S114 of FIG. 43).

Figure 44:
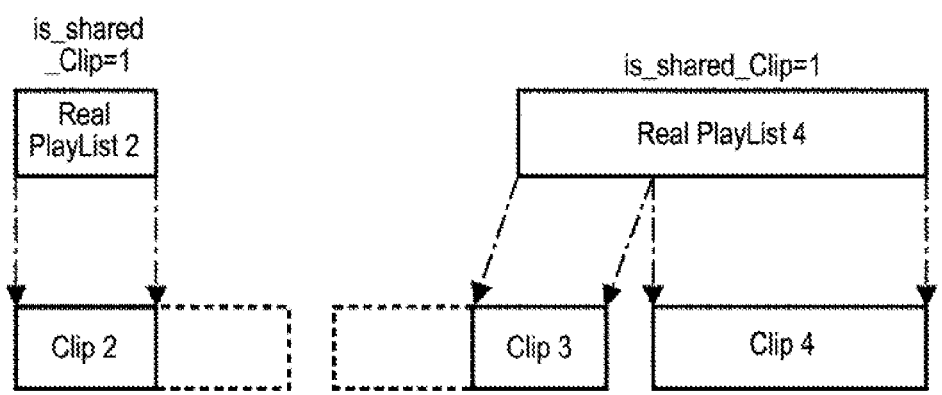
FIG. 44 is a diagram illustrating editing of the Real PlayList.

FIG. 44 illustrates the Real PlayList after the recording process of FIG. 43 and the deletion process of FIG. 35 are performed, and then the Real PlayList 3 is deleted from the state of FIG. 40. The variation in the Real PlayList and Clip, which accompanies the deletion process in FIG. 35, is the same as the case explained with reference to FIG. 42.

As shown in FIG. 44, when the Clip 2 that is referred to by the Real PlayList 2, and the Clips 3 and 4 that are referred to by the Real PlayList 4 are not referred to by another Real PlayList, in the recording process of FIG. 43, the following process is performed with respect to the is_shared_Clip. That is, as shown in FIG. 40, the is_shared_Clip of the Real PlayList 2 and the Real PlayList 4 is already set to 1 before the editing. In this case, in step S112, it is always determined as NO. As a result thereof, when 1 is once set to the is_shared_Clip, the process of setting 0 to the is_shared_Clip in step S115 is not performed, and the is_shared_Clip is left to 1.

In this case, when deleting the Real PlayList 3, only the information of the INDEX.BAV with respect to the Real PlayList 3 may be deleted (updated), and the information of the INDEX.BAV with respect to the Real PlayList 2 and the Real PlayList 4 may not be updated. That is, since only the information of the INDEX.BAV of the Real PlayList that is an object to be deleted may be updated by broadening the meaning of the is_shared_Clip from the above-described (2) to (3), the management of the content of the INDEX.BAV may be performed easily.

Next, an effect of the is_shared_Clip of the INDEX.BAV will be described. It is assumed that a reference state of Clips of all PlayLists, which are recorded below the PLAYLIST directory, is set to a state of FIG. 39.

It is assumed that now, the Real PlayList 2 is deleted from the state of FIG. 39. The Real PlayList 2 is referring to Clip 2. In a case where the is_shared_Clip of the INDEX.BAV does not exist, it is necessary to read out other Real PlayList 1, Real PlayList 3, and Real PlayList 4 from the recording medium 100, and to examine whether or not the Clip 2 is referred to by these Real PlayLists. In this example, since the number of the PlayLists below the PLAYLIST directory is four, it does not take a long time to read out the three files.

However, in a case where the number of the PlayLists that are recorded on the recording medium 100 is large (for example, 10,000 or more), it takes a long time to read out all of the PlayLists and to examine whether or not the Clip 2 is referred to by these PlayLists.

Therefore, the is_shared_Clip is recorded in the INDEX.BAV, this value is examined, and only the Playlist in which the value is 1 is made to be read out. In this case, it may be expected that the number of the PlayLists that are necessary to be read out is decreased. As a result, it is possible to shorten a time taken to examine a reference relationship between the PlayList and Clips.

[Application of Embodiment of Present Disclosure to Program]

The above-described series of processes may be executed by hardware or software.

In a case where the above-described series of processes is executed by the software, a program making up the software may be installed on a computer in which dedicated hardware is assembled, or for example, a general purpose personal computer or the like that can execute various functions by installing various programs over a network or from a recording medium.

The recording medium that including this program may be configured by not only a magnetic disk (including a floppy disk), the optical disc (including a CD-ROM (Compact Disc-Read Only Memory) and a DVD (Digital Versatile Disc)), a magneto-optical disc (including an MD (Mini-Disc)), or a removable media including a semiconductor memory, on which a program is recorded and which are distributed separately from the device main body so as to present a program to a user, but also a flash ROM, a hard disk, or the like in which a program is recorded in advance, which is presented to a user in a state of being assembled in the device main body.

In addition, in this specification, a step of describing the program that is recorded on the recording medium includes not only a process that is performed in a time series according to a sequence, but also a process that is performed in parallel or individually although not being processed in time series.

Embodiments of the present disclosure is not limited to the above-described embodiments, and various modifications may be made without departing from the scope of the present disclosure.

[Others]

The present disclosure may be implemented as the following configurations.

(1) An information processing device comprising:
a controller to:
control generation or alteration of a first reproduction information according to a flag, wherein the flag indicates whether a content file referred to by the first reproduction information is referred to by second reproduction information.

(2) The information processing device according to (1), wherein alteration of the first reproduction information comprises dividing the first reproduction information.

(3) The information processing device according to (2), wherein, in response to dividing the first reproduction information, the flag is set to indicate that the content file referred to by the first reproduction information is referred to by the second reproduction information.

(4) The information processing device according to (1), wherein alteration of the first reproduction information comprises combining the first reproduction information with other reproduction information.

(5) The information processing device according to (4), wherein, in response to combining the reproduction information with the other reproduction information, the flag is set to indicate that the content file referred to by the first reproduction information is not referred to by the second reproduction information.

(6) The information processing device according to (1), wherein, in response to generation of the first reproduction information, the flag is set to indicate that the content file referred to by the first reproduction information is not referred to by the second reproduction information.

(7) The information processing device according to (1), wherein, in the event that the content file referred to by the first reproduction information is referred to by the second reproduction information, the flag is set to a binary value of one.

(8) The information processing device according to (1), wherein, in the event that the content file referred to by the first reproduction information is referred to by the second reproduction information, the content file is not deleted in response to an instruction to delete the first reproduction information.

(9) The information processing device according to (1), wherein, in the event that the content file referred to by the first reproduction information is not referred to by the second reproduction information, the flag is set to a binary value of zero.

(10) The information processing device according to (1), wherein, in the event that the content file referred to by the first reproduction information is not referred to by the second reproduction information, the content file is deleted in response to an instruction to delete the first reproduction information.

(11) The information processing device according to (1), wherein the first reproduction information is one of a first play list file and a first index, and the second reproduction information is one of a second play list file and a second index.

(12) An information processing device comprising:
a controller to:
in response to receiving an instruction to delete a first reproduction information, access a first flag associated with the first reproduction information, wherein the first flag indicates whether to delete both the first reproduction information and a first content file referred to by the first reproduction information; and
in the event that the first flag indicates that both the first reproduction information and the first content file are to be deleted in response to the instruction to delete the first reproduction information, control deletion of the first reproduction information and the first content file.

(13) The information processing device according to (12), wherein the controller is further configured to, in the event that the first flag indicates that the first content file is not to be deleted in response to the instruction to delete the first reproduction information, access a second flag associated with second reproduction information that indicates that a second content file referred to by the second reproduction information is referred to by third reproduction information.

(14) The information processing device according to claim 13), wherein the second reproduction information is not referred to by the first reproduction information.

(15) The information processing device according to (13), wherein the first flag indicates that the first content file is not to be deleted in the event that the first content file is referred to by the second reproduction information.

(16) The information processing device according to (13), wherein the first reproduction information is one of a first play list file and a first index, and the second reproduction information is one of a second play list file and a second index.

(17) An information processing device comprising:
a controller to:
in response to an instruction to alter a first content file referred to by first reproduction information, determine whether the instruction corresponds to a deleting operation to delete the first content file, a combining operation to combine the first content file with a second content file, or a dividing operation to divide contents of the first content file; and
in the event that the instruction corresponds to the deleting operation, the combining operation, or the dividing operation, a value of a flag of the first reproduction information is set to indicate that the first content file is referred to by second reproduction information.

(18) The information processing device according to (17), wherein, in the event that the value of the flag indicates that the first content file is referred to by the second reproduction information, the first content file is not deleted in response to an instruction to delete the first reproduction information.

(19) The information processing device according to (17), wherein the first reproduction information is one of a first play list file and a first index, and the second reproduction information is one of a second play list file and a second index.

(20) A computer-implemented method that is performed by a processor in response to executing program code, the method comprising:
controlling generation or alteration of first reproduction information, according to a flag, wherein the flag indicates whether a content file referred to by the first reproduction information is referred to by second reproduction information.

(21) The method according to (20), wherein the first reproduction information is one of a first play list file and a first index, and the second reproduction information is one of a second play list file and a second index.

(22) An information processing device comprising:
a controller to: in the event that a content file referred to by first reproduction information is marked for deletion, cause a value of a flag to be changed, wherein the flag indicates whether the content file is referred to by second reproduction information.

(23) An information processing device, including:
a recording unit that records a flag representing that actual state information as an actual state of contents, which is referred to by reproduction information, is referred to by other reproduction information;
a search unit that searches for the actual state information that is deletable by using the flag, in a case where deletion of the reproduction information is instructed; and
a deletion unit that deletes the reproduction information of an object to be deleted and the deletable actual state information, in a case where the deletion of the reproduction information is instructed.

(24) The information processing device according to (23), wherein the search unit searches for the actual state information that is the actual state information referred to by the reproduction information of the object to be deleted and that is not referred to by the reproduction information other than the object to be deleted, as the deletable actual state information.

(25) The information processing device according to (23) or (24),
wherein the search unit searches for the actual state information that is deletable among plural pieces of the actual state information that are referred to by the reproduction information having the flag representing that the actual state information is referred to by other reproduction information.

(26) The information processing device according to any one of (23) to (25),
wherein in a case where the flag of the reproduction information of the object to be deleted represents that the actual state information referred to by the reproduction information of the object to be deleted is not referred to by other reproduction information, the deletion unit deletes the reproduction information of the object to be deleted and the actual state information that is referred to by the reproduction information of the object to be deleted.

(27) The information processing device according to (26),
wherein the deletion unit further deletes the reproduction information that refers to the actual state information that is deleted, and that does not share the actual state information.

(28) The information processing device according to any one of (23) to (27), further including:
a setting unit that sets the flag along with the editing of the reproduction information.

(29) The information processing device according to (28),
wherein in a case where the reproduction information is divided, the setting unit sets the flag in a state representing that the actual state information is referred to by other reproduction information, and in a case where the reproduction information is created, combined, and partially deleted, the setting unit sets the flag in a state representing that the actual state information is not referred to by other reproduction information.

(30) The information processing device according to (28) or (29),
wherein in a case where the flag of the reproduction information before editing is set in a state representing that the actual state information is referred to by other reproduction information, when the actual state information referred to by the reproduction information after the editing is not referred to by other reproduction information of the flag representing that the actual state information is referred to by other reproduction information, the setting unit changes the flag in a state representing that the actual state information is not referred to by other reproduction information.

(31) The information processing device according to any one of (28) to (30),
wherein the flag represents that the actual state information is referred to by other reproduction information one time after the reproduction information is recorded, and
in a case where the flag is set once in a state representing that the actual state information is referred to by other reproduction information, after this, the setting unit does not change the flag in a state representing that the actual state information is not referred to by other reproduction information.

(32) An information processing method, including:
recording a flag representing that actual state information as an actual state of contents, which is referred to by reproduction information, is referred to by other reproduction information;
searching for the actual state information that is deletable by using the flag, in a case where deletion of the reproduction information is instructed; and
deleting the reproduction information of an object to be deleted and the deletable actual state information, in a case where the deletion of the reproduction information is instructed.

(33) A program that allows a computer to execute processes, the processes including:
recording a flag representing that actual state information as an actual state of contents, which is referred to by reproduction information, is referred to by other reproduction information;
searching for the actual state information that is deletable by using the flag, in a case where deletion of the reproduction information is instructed; and
deleting the reproduction information of an object to be deleted and the deletable actual state information, in a case where the deletion of the reproduction information is instructed.

The present disclosure contains subject matter related to that disclosed in Japanese Priority Patent Application JP 2011-260279 filed in the Japan Patent Office on Nov. 29, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1: Recording and reproducing device
11, 12, 13: Terminal
14: Analysis unit
15: AV encoder
16: Multiplexer
17: Switch
18: Multiplexed stream analyzing unit
19: Source packetizer
20: ECC encoding unit
21: Modulation unit
22: Writing unit
23: Control unit
24: User interface
26: Demultiplexer
27: AV decoder
28: Reading-out unit
29: Demodulation unit
30: ECC decoding unit
31: Source packetizer
32, 33: Terminal
201: Recording unit
202: Acquisition unit
203: Determination unit
204: Display unit

The invention claimed is:

1. An information processing device, comprising:
a controller configured to:
control generation or alteration of first reproduction information which is based on a flag, wherein the flag indicates that a content file is referred by the first reproduction information, and wherein the first reproduction information is further referred by second reproduction information.

2. The information processing device according to claim 1, wherein the alteration of the first reproduction information comprises division of the first reproduction information.

3. The information processing device according to claim 2, wherein, based on the division of the first reproduction information, the flag is set to indicate that the content file is referred by the first reproduction information, and wherein the first reproduction information is further referred by the second reproduction information.

4. The information processing device according to claim 1, wherein the alteration of the first reproduction information comprises a combination of the first reproduction information and third reproduction information.

5. The information processing device according to claim 4, wherein, based on the combination of the first reproduction information and the third reproduction information, the flag is set to indicate that the content file is referred by the first reproduction information, and wherein the first reproduction information is unreferred by the second reproduction information.

6. The information processing device according to claim 1, wherein, based on the generation of the first reproduction information, the flag is set to indicate that the content file is referred by the first reproduction information, and wherein the first reproduction information is unreferred by the second reproduction information.

7. The information processing device according to claim 1, wherein, based on the content file being referred by the first reproduction information, and wherein the first reproduction information is further referred by the second reproduction information, the flag is set to a binary value of one.

8. The information processing device according to claim 1, wherein, based on the content file being referred by the first reproduction information, and wherein the first reproduction information is further referred by the second reproduction information, the content file is prevented from deletion based on an instruction to delete the first reproduction information.

9. The information processing device according to claim 1, wherein, based on the content file being referred by the first reproduction information, and wherein the first reproduction information is unreferred by the second reproduction information, the flag is set to a binary value of zero.

10. The information processing device according to claim 1, wherein, based on the content file being referred by the first reproduction information, and wherein the first reproduction information is unreferred by the second reproduction information, the content file is deleted based on an instruction to delete the first reproduction information.

11. The information processing device according to claim 1, wherein the first reproduction information is at least one of a first play list file or a first index, and the second reproduction information is at least one of a second play list file or a second index.

12. A non-transitory computer-readable storage medium having stored thereon, computer-executable instructions for causing a computer to execute operations, the operations comprising:
controlling generation or alteration of first reproduction information, based on a flag, wherein the flag indicates that a content file is referred by the first reproduction information, and wherein the first reproduction information is further referred by second reproduction information.

13. The computer-readable storage medium according to claim 12, wherein the first reproduction information is at least one of a first play list file or a first index, and the second reproduction information is at least one of a second play list file or a second index.

* * * * *